United States Patent
Hwang et al.

(10) Patent No.: US 11,889,467 B2
(45) Date of Patent: Jan. 30, 2024

(54) METHOD AND APPARATUS FOR TRANSMITTING OR RECEIVING SIGNAL IN MOBILE COMMUNICATION SYSTEM

(71) Applicant: Samsung Electronics Co., Ltd., Suwon-si (KR)

(72) Inventors: June Hwang, Suwon-si (KR); Soenghun Kim, Suwon-si (KR); Sangyeob Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/146,676

(22) Filed: Dec. 27, 2022

(65) Prior Publication Data

US 2023/0147117 A1 May 11, 2023

Related U.S. Application Data

(63) Continuation of application No. 16/532,997, filed on Aug. 6, 2019, now Pat. No. 11,540,250.

(30) Foreign Application Priority Data

Aug. 6, 2018 (KR) .......................... 10-2018-0091505
Sep. 27, 2018 (KR) .......................... 10-2018-0115279

(51) Int. Cl.
*H04W 68/00* (2009.01)
*H04W 24/08* (2009.01)
(Continued)

(52) U.S. Cl.
CPC ......... *H04W 68/005* (2013.01); *H04W 24/08* (2013.01); *H04W 72/23* (2023.01);
(Continued)

(58) Field of Classification Search
CPC ... H04W 68/005; H04W 24/08; H04W 72/23; H04W 76/11; H04W 76/27; H04W 80/02
See application file for complete search history.

(56) References Cited

U.S. PATENT DOCUMENTS 8,060,122 B2 * 11/2011 Tseng .................... H04W 76/28
455/458
10,129,775 B2 * 11/2018 Centonza .............. H04W 24/02
(Continued)

FOREIGN PATENT DOCUMENTS

CN 102036318 A 4/2011
EP 2 966 928 A1 1/2016

OTHER PUBLICATIONS

NTT Docomo, Inc., "Remaining issues on Paging design", R1-1802463, 3GPP TSG RAN WG1 #92, Athens, Greece, Feb. 17, 2018.
(Continued)

*Primary Examiner* — Kibrom T Hailu
(74) *Attorney, Agent, or Firm* — Jefferson IP Law, LLP

(57) ABSTRACT

A communication technique for convergence of internet of thing (IoT) technology and a 5th generation (5G) communication system for supporting a higher data transfer rate beyond a 4th generation (4G) system, and a system therefor are provided. The disclosure can be applied to intelligent services (e.g., smart homes, smart buildings, smart cities, smart or connected cars, health care, digital education, retail business, and services associated with security and safety) on the basis of 5G communication technology and IoT-related technology. The disclosure provides a paging monitoring method according to a state of a terminal and a method for reporting a connection setup failure in consideration of an inactive state of the terminal.

14 Claims, 25 Drawing Sheets

(51) Int. Cl.
*H04W 80/02* (2009.01)
*H04W 76/11* (2018.01)
*H04W 76/27* (2018.01)
*H04W 72/23* (2023.01)

(52) U.S. Cl.
CPC ............ *H04W 76/11* (2018.02); *H04W 76/27* (2018.02); *H04W 80/02* (2013.01)

(56) References Cited

U.S. PATENT DOCUMENTS

| | | | |
|---|---|---|---|
| 10,492,108 B2* | 11/2019 | Wu | H04W 74/0833 |
| 10,631,353 B2* | 4/2020 | Shih | H04W 72/231 |
| 2008/0299996 A1* | 12/2008 | Tseng | H04W 76/28 455/458 |
| 2009/0067386 A1 | 3/2009 | Kitazoe | |
| 2010/0216469 A1 | 8/2010 | Yi et al. | |
| 2013/0196650 A1 | 8/2013 | Futaki | |
| 2014/0198640 A1 | 7/2014 | Suzuki et al. | |
| 2015/0327240 A1 | 11/2015 | Yamada et al. | |
| 2016/0014681 A1* | 1/2016 | Yi | H04W 48/16 455/422.1 |
| 2016/0014839 A1* | 1/2016 | Liu | H04W 76/11 370/329 |
| 2016/0037579 A1* | 2/2016 | Jung | H04W 24/08 370/252 |
| 2016/0165521 A1 | 6/2016 | Choi et al. | |
| 2016/0249235 A1* | 8/2016 | Li | H04W 76/19 |
| 2016/0249266 A1 | 8/2016 | Kim et al. | |
| 2016/0249341 A1 | 8/2016 | Jung et al. | |
| 2016/0353348 A1 | 12/2016 | Lee et al. | |
| 2017/0105136 A1 | 4/2017 | Reider et al. | |
| 2017/0135005 A1 | 5/2017 | Basu Mallick et al. | |
| 2017/0142566 A1 | 5/2017 | Lin | |
| 2017/0164250 A1 | 6/2017 | Kim et al. | |
| 2018/0041857 A1 | 2/2018 | Ouchi et al. | |
| 2018/0092018 A1 | 5/2018 | Jung et al. | |
| 2018/0124702 A1 | 5/2018 | Jung et al. | |
| 2018/0152924 A1 | 5/2018 | Ouchi | |
| 2018/0160422 A1* | 6/2018 | Pathak | H04W 76/10 |
| 2018/0176972 A1 | 6/2018 | Jung et al. | |
| 2018/0206168 A1 | 7/2018 | Jia et al. | |
| 2019/0045481 A1 | 2/2019 | Sang et al. | |
| 2019/0124711 A1* | 4/2019 | Dai | H04W 76/18 |
| 2019/0319686 A1 | 10/2019 | Chen, IV et al. | |
| 2020/0137669 A1 | 4/2020 | Lee et al. | |
| 2020/0162983 A1 | 5/2020 | Fujishiro et al. | |
| 2020/0186312 A1 | 6/2020 | Mochizuki et al. | |
| 2020/0228931 A1 | 7/2020 | Maattanen | |
| 2020/0288338 A1 | 9/2020 | Freda et al. | |
| 2020/0305129 A1 | 9/2020 | Lee et al. | |
| 2021/0029569 A1 | 1/2021 | Kim | |
| 2021/0058895 A1 | 2/2021 | Gao et al. | |
| 2021/0105645 A1 | 4/2021 | Rune et al. | |
| 2021/0136658 A1 | 5/2021 | Ronneke et al. | |

OTHER PUBLICATIONS

3GPP; TSGRAN; NR; User Equipment (UE) procedures in Idle mode and RRC Inactive state (Release 15)', 3GPP TS 38.304 V15.0.0, Jun. 20, 2018.
Intel Corporation, "Notification of System Information Update", R2-1805016, 3GPP TSG RAN WG2 #101bis, Sanya, China, Apr. 6, 2018.
Huawei et al., "The UE behaviour when the inactive UE enters out of coverage from camped normally state", R2-1808080, 3GPP TSG RAN WG2 #102, Busan, Korea, May 10, 2018.
International Search Report dated Oct. 29, 2019, issued in International Application No. PCT/KR2019/009787.
Written Opinion dated Oct. 29, 2019, issued in International Application No. PCT/KR2019/009787.
Ericsson; Monitoring paging in Camped on Any Cell state; 3GPP TSG-RAN2 Meeting #104; R2-1817144; Nov. 12-16, 2018; Spokane, USA.
Samsung; Discussion on Paging Monitoring in Camped on Any Cell state; 3GPP TSG-RAN2 104; R2-1817002 (Revision of R2-1815125); Nov. 12-16, 2018; Spokane, USA.
Ericsson; Correction to monitoring paging in Camped on Any Cell state; 3GPP TSG-RAN2 Meeting #104; R2-1817145; Nov. 12-16, 2018; Spokane, USA.
Alcatel-Lucent; IMS emergency call when UE camps on acceptable cell (modify Camped on Any cell state); 3GPP TSG-RAN WG2 Meeting #67; R2-094565; Aug. 24-28, 2009; Shenzhen, China.
European Search Report dated Sep. 2, 2021; European Appln. No. 19848037.8-1231 / 3818778 PCT/KR2019009787.
European Search Report dated Mar. 14, 2023; European Appln. No. 22207634.1-1215.
Indian Office Action dated Apr. 3, 2023; Indian Appln. No. 202137004971.

* cited by examiner

FIG. 21

```
ConnEstFailReport-r11 ::=      SEQUENCE {
    failureType              ENUMERATED {T300-expiry, T319-expiry},
    nrOfConsecuritveFailure  ENUMERATED {n1, n2, n3, n4, n5 ....},
    failedCellId-r11         CellGlobalIdEUTRA,
    locationInfo-r11         LocationInfo-r10                    OPTIONAL,
    measResultFailedCell-r11  SEQUENCE {
        rsrpResult-r11       RSRP-Range,
        rsrpResult-r11       RSRQ-Range           OPTIONAL,
    },
    measResultNeighCells-r11  SEQUENCE {
        measResultListEUTRA-r11   MeasResultList2EUTRA-r9        OPTIONAL,
        measResultListUTRA-r11    MeasResultList2UTRA-r9         OPTIONAL,
        measResultListGERAN-r11   MeasResultListGERAN            OPTIONAL,
        measResultsCDMA2000-r11   MeasResultList2CDMA2000-r9     OPTIONAL,
    } OPTIONAL,
    numberOfPreamblesSent-r11    NumberOfPreamblesSent-r11,
    contentionDetected-r11       BOOLEAN,
    maxTxPowerReached-r11        BOOLEAN,
    timeSinceFailure-r11         TimeSinceFailure-r11,
    measResultListEUTRA-v1130    MeasResultList2EUTRA-v9e0       OPTIONAL,
    ...
}
```

FIG. 22

```
ConnEstFailReport -T300expiry ::=            SEQUENCE {
    nrOfConsecuritveFailure      ENUMERATED {n1, n2, n3, n4, n5 ... },
    failedCellId-r11             CellGlobalIdEUTRA,
    locationInfo-r11             LocationInfo-r10                   OPTIONAL,
    measResultFailedCell-r11     SEQUENCE {
        rsrpResult-r11               RSRP-Range,
        rsrpResult-r11               RSRP-Range                     OPTIONAL
    },
    numberOfPreamblesSent-r11    NumberOfPreamblesSent-r11,
    contentionDetected-r11       BOOLEAN,
    maxTxPowerReached-r11        BOOLEAN,
    timeSinceFailure-r11         TimeSinceFailure-r11,
    measResultListEUTRA-v1130    MeasResultList2EUTRA-v9e0          OPTIONAL
    ...
}

ConnEstFailReport -T319expiry ::=            SEQUENCE {
    nrOfConsecuritveFailure      ENUMERATED {n1, n2, n3, n4, n5 ... },
    failedCellId-r11             CellGlobalIdEUTRA,
    locationInfo-r11             LocationInfo-r10                   OPTIONAL,
    measResultFailedCell-r11     SEQUENCE {
        rsrpResult-r11               RSRP-Range,
        rsrpResult-r11               RSRP-Range                     OPTIONAL
    },
    numberOfPreamblesSent-r11    NumberOfPreamblesSent-r11,
    contentionDetected-r11       BOOLEAN,
    maxTxPowerReached-r11        BOOLEAN,
    timeSinceFailure-r11         TimeSinceFailure-r11,
    measResultListEUTRA-v1130    MeasResultList2EUTRA-v9e0          OPTIONAL
    ...
}
```

METHOD AND APPARATUS FOR TRANSMITTING OR RECEIVING SIGNAL IN MOBILE COMMUNICATION SYSTEM

CROSS-REFERENCE TO RELATED APPLICATION(S)

This application is a continuation application of prior application Ser. No. 16/532,997, filed on Aug. 6, 2019, which has issued as U.S. Pat. No. 11,540,250 on Dec. 27, 2022 and is based on and claims priority under 35 U.S.C. 119(a) of a Korean patent application number 10-2018-0091505, filed on Aug. 6, 2018, in the Korean Intellectual Property Office, and a Korean patent application number 10-2018-0115279, filed on Sep. 27, 2018, in the Korean Intellectual Property Office, the disclosure of each of which is incorporated by reference herein in its entirety.

BACKGROUND

1. Field

The disclosure relates to a paging monitoring method and apparatus according to a state of a terminal in a mobile communication system. More particularly, the disclosure relates to a method and an apparatus for reporting a connection setup failure in consideration of an inactive state of a terminal in a mobile communication system.

2. Description of the Related Art

In order to meet wireless data traffic demands having increased after commercialization of 4th generation (4G) communication systems, efforts to develop an improved 5th generation (5G) communication system or a pre-5G communication system have been made. For this reason, the 5G communication system or the pre-5G communication system is called a "beyond 4G network communication system" or a "post long-term evolution (LTE) system". In order to achieve a high data transfer rate, the implementation of the 5G communication system in a millimeter wave (mmWave band) (e.g., 60 GHz band) has been considered. In order to mitigate a propagation path loss and increase a propagation transmission distance in the mmWave band, technologies, such as beamforming, massive multiple-input multiple-output (MIMO), full dimensional MIMO (FD-MIMO), array antenna, analog beamforming, and large-scale antenna, are under discussion for 5G communication systems. Further, in order to improve system networks, technologies, such as an evolved small cell, an advanced small cell, a cloud radio access network (RAN), an ultra-dense network, device-to-device (D2D) communication, a wireless backhaul, a moving network, cooperative communication, coordinated multi-points (CoMP), and received interference cancellation, are under development for 5G communication systems. In addition, advanced coding modulation (ACM) schemes, such as hybrid FSK and quadrature amplitude modulation (QAM) modulation (FQAM) and sliding window superposition coding (SWSC), and advanced access technologies, such as filter bank multi carrier (FBMC), non-orthogonal multiple access (NOMA), and sparse code multiple access (SCMA), are under development for 5G communication systems.

The Internet is evolving from a human-centered connectivity network where humans create and consume information into the Internet of Things (IoT) network where distributed elements, such as objects, exchange and process information. The Internet of Everything (IoE), which is implemented by combining IoT technology and big data processing technology through connection with a cloud server or the like, has emerged. In order to implement IoT, technical factors, such as a sensing technique, wired/wireless communication, network infrastructure, service interface technology, and security technology, are required, and thus, research has recently been conducted on technologies, such as a sensor network, machine-to-machine (M2M) communication, and machine-type communication (MTC), for a connection between objects. In an IoT environment, it is possible to provide intelligent Internet technology services that create a new value for human life by collecting and analyzing data generated from connected objects. Through convergence and combination between existing information technology (IT) and various industries, IoT may be applied to fields, such as smart homes, smart buildings, smart cities, smart cars or connected cars, smart grids, health care, smart appliances, and high-tech medical services.

Accordingly, various attempts have been made to apply 5G communication systems to IoT networks. For example, technologies such as a sensor network, M2M communication, and MTC are implemented by techniques such as beamforming, MIMO, and array antennas which are the 5G communication technology. The application of a cloud radio access network (cloud RAN) as the above-described big data processing technology may also be an example of convergence between the 5G technology and the IoT technology.

In a mobile communication system, a connection setup failure report is an operation in which, if a terminal having transitioned from an unconnected state to a connected state subsequently succeeds in accessing a network, terminal information possessed by the terminal in a state in which an initial setup attempt by the terminal has failed, is delivered to a base station, and thus the terminal transmits information used for the base station to take measures in a network stage so that a setup attempt failure is prevented from subsequently occurring.

A next-generation mobile communication system employs an inactive state as well as a connected state and an idle state, and thus a connection setup failure operation should be newly considered in relation to a setup attempt in the inactive state as well as a setup attempt in the idle state. However, in an existing system, only a setup attempt in an idle state exists, so that a connection setup failure for a new state should be defined, and thus it is necessary to include notice of the type of setup, a failure of which has occurred, in the contents of an activated report.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

Accordingly, an aspect of the disclosure is to provide a method for monitoring a short message and a paging message when a terminal is in a radio resource control (RRC) idle mode or an RRC inactive mode.

Another aspect of the disclosure is to provide a method for in a next-generation mobile communication system employing an inactive state as well as a connected state and an idle state, defining a connection setup failure for a new state by newly considering a setup attempt in the inactive state as well as a setup attempt in the idle state, and giving notice of the type of setup, a failure of which has occurred, in the contents of an report activated accordingly. A network may be notified of information on how serious failures are, by using information on how many times the relevant consecutive failures have occurred. Further, in the case of multiple connection failures, different power offset values may be applied to cell selection or cell reselection, according to failure types.

Additional aspects will be set forth in part in the description which follows and, in part, will be apparent from the description, or may be learned by practice of the presented embodiments.

In accordance with an aspect of the disclosure, a method for processing a control signal in a wireless communication system is provided. The method includes receiving a first control signal transmitted by a base station, processing the received first control signal, and transmitting, to the base station, a second control signal generated on the basis of the processing of the received first control signal.

In accordance with an aspect of the disclosure, a method of a user equipment (UE) in a wireless communication system is provided. The method includes identifying the UE is in a camped on any cell state or a camped normally state; monitoring a short message in case that the UE is in the camped on any cell state; and monitoring a short message and a paging message in case that the UE is in the camped normally state.

In accordance with another aspect of the disclosure, a method of a base station in a wireless communication system is provided. The method includes identifying whether to transmit a short message and scheduling information for a paging message; transmitting, to a user equipment (UE), the short message on a physical downlink control channel (PDCCH) using paging radio network temporary identifier (P-RNTI) based on the identification; and transmitting, to the UE, the paging message based on the scheduling information in case that the scheduling information is identified to transmit.

In accordance with another aspect of the present disclosure, a user equipment in a wireless communication system is provided. The UE includes a transceiver; and at least one processor coupled with the transceiver, the processor is configured to: identify the UE is in a camped on any cell state or a camped normally state; monitor a short message in case that the UE is in the camped on any cell state; and monitor a short message and a paging message in case that the UE is in the camped normally state.

In accordance with another aspect of the present disclosure, a base station in a wireless communication system is provided. The base station includes a transceiver; and at least one processor coupled with the transceiver, the processor is configured to: identify whether to transmit a short message and scheduling information for a paging message; control to transceiver to transmit, to a user equipment (UE), the short message on a physical downlink control channel (PDCCH) using paging radio network temporary identifier (P-RNTI) based on the identification; and control to transceiver to transmit, to the UE, the paging message based on the scheduling information in case that the scheduling information is identified to transmit.

An embodiment enables monitoring of a short massage or a paging message, according to the state of a terminal.

Further, another embodiment enables a base station to more accurately analyze causes of failure of a connection attempt by a terminal and more accurately take measures accordingly.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which:

FIG. 21 is a view illustrating a format of a usable connection setup failure report according to an embodiment of the disclosure;

FIG. 22 is a view illustrating a format of a usable connection setup failure report according to an embodiment of the disclosure;

Throughout the drawings, it should be noted that like reference numbers are used to depict the same or similar elements, features, and structures.

DETAILED DESCRIPTION

Figure 1:
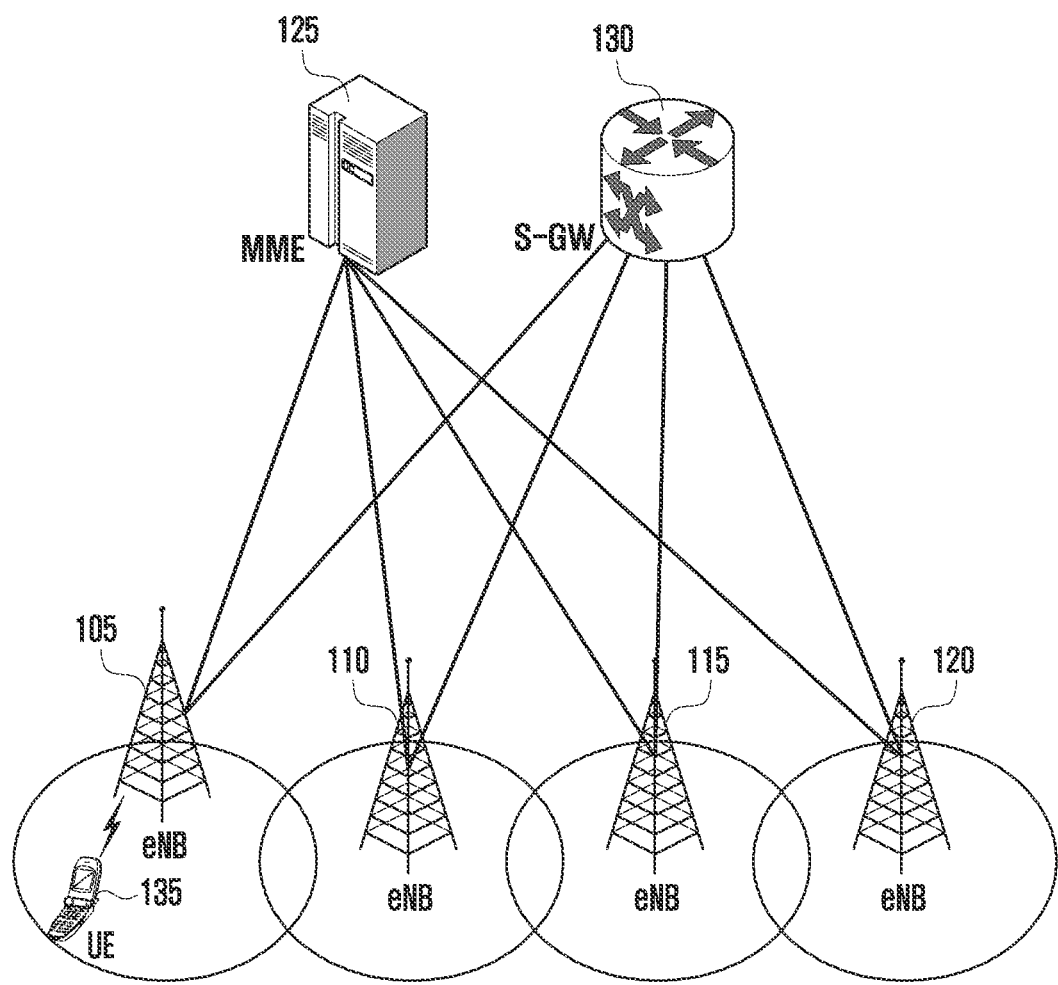
FIG. 1 is a view illustrating an architecture of an LTE system architecture according to an embodiment of the disclosure.

The following description with reference to the accompanying drawings is provided to assist in a comprehensive understanding of various embodiments as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

Here, it may be understood that each block of processing flowcharts and combinations of the flowcharts may be performed by computer program instructions. Since these computer program instructions may be loaded into processors for a general computer, a special-purpose computer, or other programmable data-processing apparatuses, these instructions executed by the processors for the computer or the other programmable data-processing apparatuses may create means for performing functions described in block(s) of the flowcharts. Since these computer program instructions may also be stored in a non-transitory computer-usable or computer-readable memory of a computer or other programmable data-processing apparatuses in order to implement the functions in a specific scheme, the computer program instructions stored in the non-transitory computer-usable or computer-readable memory may also produce manufacturing articles including instruction means performing the functions described in block(s) of the flowcharts. Since the computer program instructions may also be loaded into a computer or other programmable data-processing apparatuses, the instructions may cause a series of operation steps to be performed on the computer or other programmable data-processing apparatuses so as to generate processes executable by the computer and enable an operation of the computer or other programmable data-processing apparatuses, and may also provide steps for implementing the functions described in the flowchart block(s).

Also, each block may indicate some of modules, segments, or codes including one or more executable instructions for executing a specific logical function(s). Further, it is to be noted that the functions mentioned in the blocks may occur out of order in some alternative embodiments. For example, two blocks that are consecutively illustrated may be performed substantially concurrently or may sometimes be performed in the reverse order, according to corresponding functions.

Here, the term "~unit" used in the embodiment means software or hardware elements such as a field-programmable gate array (FPGA) and an application-specific integrated circuit (ASIC), and the "~unit" may perform any roles. However, the meaning of "~unit" is not limited to software or hardware. The "~unit" may be configured to reside in a storage medium that may be addressed, and may also be configured to reproduce one or more processors. Accordingly, for example, the "~unit" includes: elements such as software elements, object-oriented software elements, class elements, and task elements; and processors, functions, attributes, procedures, subroutines, segments of program code, drivers, firmware, microcode, circuits, data, databases, data structures, tables, arrays, and variables. The functions provided in the elements and "~units" may be combined with a smaller number of elements and "~units" or may be further separated into additional elements and "~units". In addition, the elements and the "~units" may also be implemented to reproduce one or more central processing unit (CPU)s within a device or a security multimedia card. Further, in embodiments, "~unit" may include at least one processor.

In the disclosure, a downlink (DL) means a radio transmission path of a signal transmitted from a base station to a terminal, and an uplink (UL) means a radio transmission path of a signal transmitted from the terminal to the base station. Also, an LTE or LTE-A system may be described below by way of example, but embodiments may be applied to other communication systems having a similar technical background or channel form. For example, 5th generation (5G) mobile communication technology (5G or NR) developed after LTE-A may be included in systems to which embodiments may be applied, and 5G described below may be a concept including the existing LTE, LTE-A, and other similar services. Further, according to the determination of those skilled in the art, the disclosure may be applied to other communication systems through partial modification without departing from the scope of the disclosure.

In the following description, the terms identifying access nodes, and the terms referring to network entities, messages, interfaces between network entities, and various pieces of identification information are merely examples used for convenience of description. Therefore, the disclosure is not limited to the following terms, and other terms referring to objects having equivalent technical meanings may be used.

Hereinafter, for convenience of description, the disclosure uses terms and names defined in the 3rd generation partnership project (3GPP) LTE or NR standard. However, the disclosure is not limited to the terms and names, and may be identically applied to systems complying with other standards. In the disclosure, the term evolved node B, or "eNB," may be used interchangeably with the term next generation node b, or "gNB," for convenience of description. That is, a base station described as an eNB may represent a gNB.

In the following description of the disclosure, a detailed description of well-known functions or configurations incorporated herein will be omitted when it makes the subject matter of the disclosure unclear. Hereinafter, an embodiment will be described with reference to the accompanying drawings.

First Embodiment

FIG. 1 is a view illustrating an architecture of an LTE system architecture according to an embodiment of the disclosure.

Referring to FIG. 1, a radio access network of the LTE system may include next-generation base stations ("eNBs", "Node Bs", or "base stations") 105, 110, 115, and 120, a mobility management entity (MME) 125, and a serving-gateway (S-GW) 130. A user equipment (hereinafter "UE" or "terminal") 135 may access an external network through the eNBs 105 to 120 and the S-GW 130.

In FIG. 1, the eNBs 105 to 120 may correspond to existing Node Bs of a universal mobile telecommunications system (UMTS) system. The eNBs 105 to 120 may be connected to the UE 135 through wireless channels, and may perform more complex functions than those performed by existing Node Bs. In the LTE system, all user traffic including real-time services, such as voice over internet protocol (IP) (VoIP) services through an Internet protocol, may be served through shared channels. Therefore, there is a need for an apparatus configured to collect pieces of state information, such as buffer states, available transmission power states, and channel states of UEs so as to perform scheduling. Each of the eNBs 105 to 120 may serve as the apparatus. In general, one eNB may control multiple cells. For example, in order to achieve a transfer rate of 100 Mbps, in a 20 MHz bandwidth, the LTE system may employ an orthogonal frequency division multiplexing (OFDM) scheme as radio access technology. Further, the eNBs 105 to 120 may employ an adaptive modulation and coding (AMC) scheme for determining a modulation scheme and a channel coding rate so as to match a channel state of the UE 135. The S-GW 130 is an apparatus configured to provide data bearers, and may establish or release data bearers under the control of the MME 125. The MME 125 is an apparatus configured to perform various control functions including a mobility management function for UEs, and may be connected to multiple eNBs.

Figure 2:
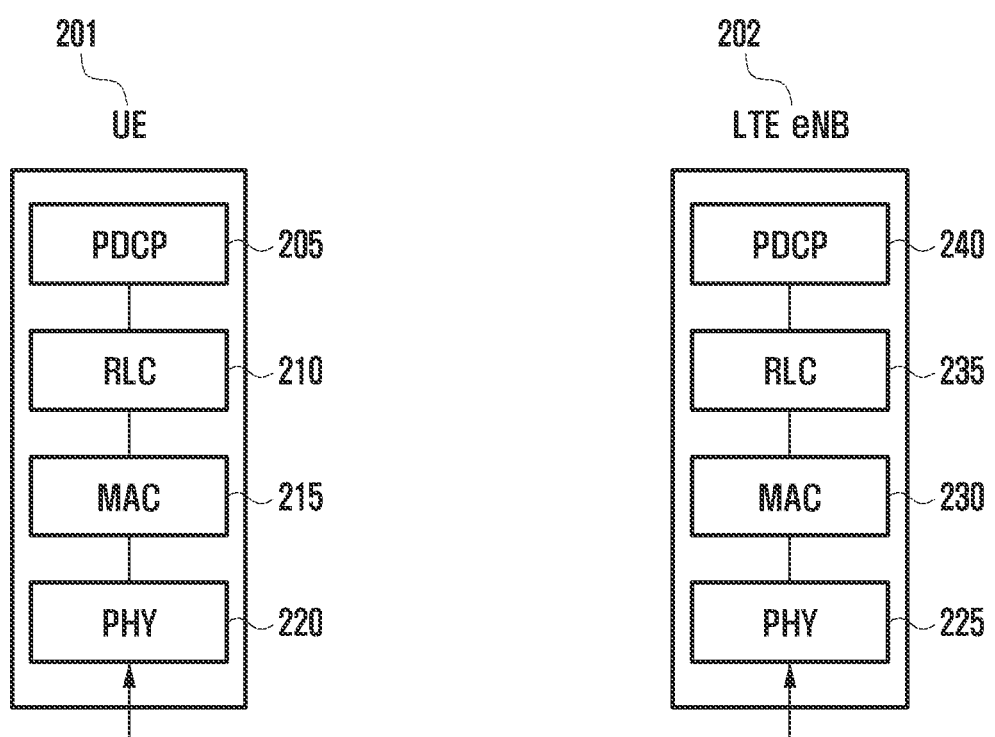
FIG. 2 is a block diagram illustrating a structure of a wireless protocol in an LTE system according to an embodiment of the disclosure.

FIG. 2 is a block diagram illustrating a structure of a wireless protocol in an LTE system according to an embodiment of the disclosure.

Referring to FIG. 2, the wireless protocol of the LTE system may include packet data convergence protocols (PDCPs) 205 and 240, radio link controls (RLCs) 210 and 235, and medium access controls (MACs) 215 and 230 in a UE 201 and an LTE eNB 202, respectively.

The PDCPs 205 and 240 may take charge of operations, such as compression/recovery of an IP header. The main functions of the PDCPs 205 and 240 may be summarized as follows:
 Function of compressing and decompressing a header (Header compression and decompression: robust header compression (ROHC) only);
 Function of transmitting user data;
 Sequential delivery function (In-sequence delivery of upper layer protocol data unit (PDU)s at PDCP re-establishment procedure for RLC acknowledged mode (AM));
 Reordering function (For split bearers in dual connectivity (DC) (only support for RLC AM): PDCP PDU routing for transmission and PDCP PDU reordering for reception);
 Duplicate detection function (Duplicate detection of lower layer service data unit (SDU)s at PDCP re-establishment procedure for RLC AM);
 Retransmission function (Retransmission of PDCP SDUs at handover and, for split bearers in DC, of PDCP PDUs at PDCP data-recovery procedure, for RLC AM);
 Function for encryption and decryption (Ciphering and deciphering); and
 Timer-based SDU discard function (Timer-based SDU discard in uplink).

The RLCs 210 and 235 may reconfigure a PDCP protocol data unit (PDU) to a suitable size so as to perform an automatic repeat request (ARQ) operation and the like. The main functions of the RLCs 210 and 235 may be summarized as follows:
 Data transmission function (Transfer of upper layer PDUs);
 ARQ function (Error correction through ARQ (only for AM data transfer));
 Function for concatenation, segmentation, and reassembly (Concatenation, segmentation, and reassembly of RLC SDUs (only for unacknowledged mode (UM) and AM data transfer));
 Re-segmentation function (Re-segmentation of RLC data PDUs (only for AM data transfer));
 Reordering function (Reordering of RLC data PDUs (only for UM and AM data transfer);

Duplicate detection function (Duplicate detection (only for UM and AM data transfer));

Error detection function (Protocol error detection (only for AM data transfer));

RLC SDU discard function (RLC SDU discard (only for UM and AM data transfer)); and RLC re-establishment function (RLC re-establishment).

The MACs 215 and 230 may be connected to multiple RLC layer devices configured in one terminal, and may multiplex RLC PDUs into MAC PDUs and may demultiplex RLC PDUs from MAC PDUs. The main functions of the MACs 215 and 230 may be summarized as follows:

Mapping function (Mapping between logical channels and transport channels);

Function for multiplexing and demultiplexing (Multiplexing/demultiplexing of MAC SDUs belonging to one or different logical channels into/from transport blocks (TBs) delivered to/from the physical layer on transport channels);

Function of reporting scheduling information;

HARQ function (Error correction through HARQ);

Function of adjusting a priority between local channels (Priority handling between logical channels of one UE);

Function of adjusting a priority between terminals (Priority handling between UEs by means of dynamic scheduling);

Function of identifying an MBMS service (MBMS service identification);

Function of selecting a transmission format (Transport format selection); and

Padding function (Padding).

The physical (PHY) layers 220 and 225 may channel-code and modulate higher layer data into OFDM symbols and transmit the OFDM symbols through a wireless channel, or may demodulate and channel-decode OFDM symbols, received through a wireless channel, into higher layer data and deliver the higher layer data to a higher layer.

Figure 3:
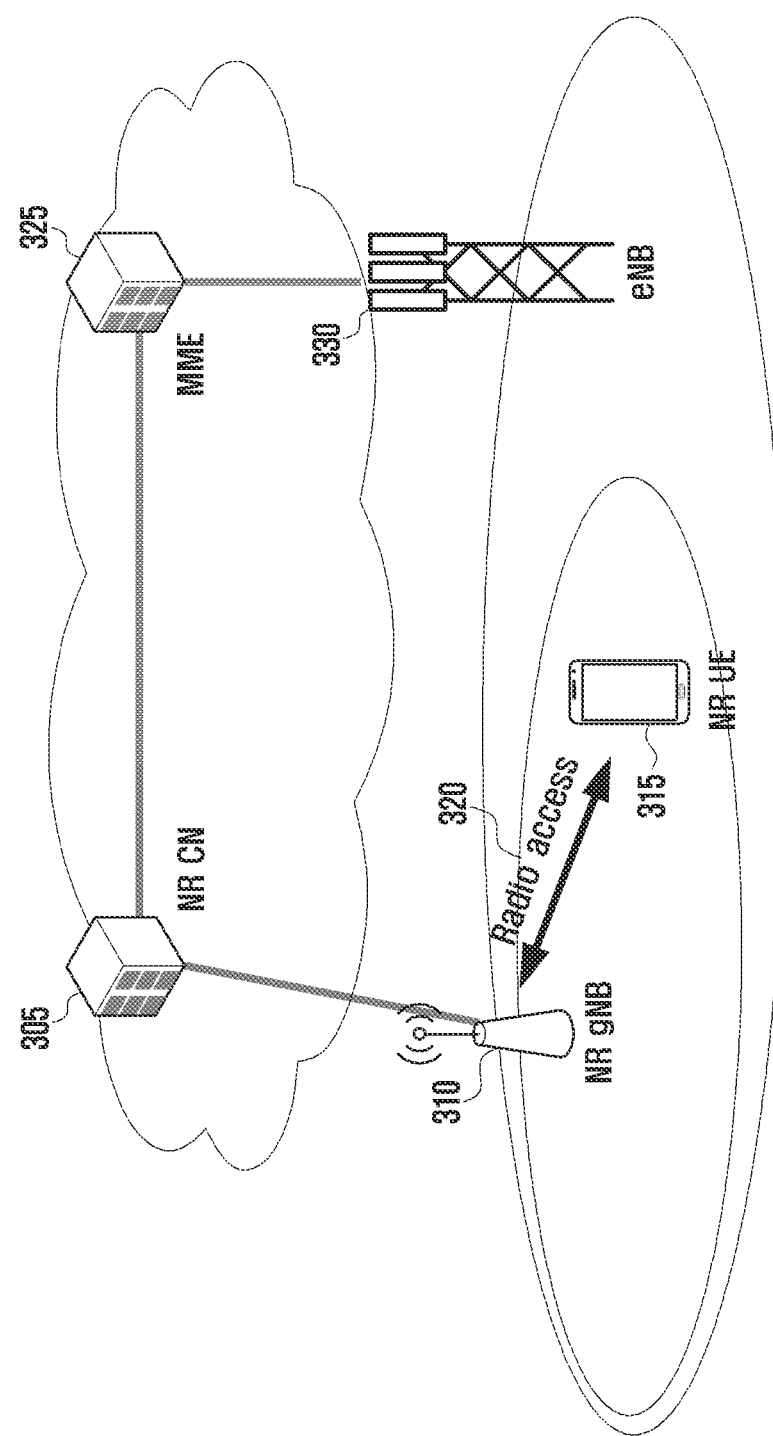
FIG. 3 is a view illustrating a structure of a next-generation mobile communication system according to an embodiment of the disclosure.

FIG. 3 is a view illustrating a structure of a next-generation mobile communication system according to an embodiment of the disclosure.

Referring to FIG. 3, a radio access network of the next-generation mobile communication system (hereinafter "NR" or "5G") may include a next-generation base station (NR Node B, hereinafter "NR gNB" or "NR base station") 310 and a next-generation radio core network (NR core network (NR CN)) 305. A next-generation radio user equipment (NR user equipment) (hereinafter "NR UE" or "terminal") 315 may access an external network through the NR gNB 310 and the NR CN 305.

In FIG. 3, the NR gNB 310 may correspond to an evolved Node B (eNB) of the existing LTE system. The NR gNB 310 is connected to the NR UE 315 through a wireless channel and may provide a service superior to that provided by the existing Node B. In the next-generation mobile communication system, all user traffics may be served through shared channels. Therefore, there is a need for an apparatus configured to collect pieces of state information, including buffer states, available transmission power states, channel states, and the like of UEs so as to perform scheduling, and the NR gNB 310 may serve as the apparatus. One NR gNB may control multiple cells. In the next-generation mobile communication system, in order to achieve ultra-high-speed data transmission in comparison to the current LTE, a current maximum bandwidth or more may be applied. Further, an orthogonal frequency division multiplexing (OFDM) scheme may be used as radio access technology and beamforming technology may be additionally combined therewith. Further, an adaptive modulation and coding (hereinafter, referred to as "AMC") scheme for determining a modulation scheme and a channel coding rate so as to match a channel state of a terminal may be applied. The NR CN 305 may perform functions, including mobility support, bearer establishment, quality of service (QoS) configuration, and the like. The NR CN 305 is an apparatus configured to perform various control functions including a mobility management function for a terminal, and may be connected to multiple base stations. Further, the next-generation mobile communication system may interwork with the existing LTE system, and the NR CN 305 may be connected to an MME 325 of the LTE system through a network interface. The MME 325 may be connected to an eNB 330 which is an existing base station.

Figure 4:
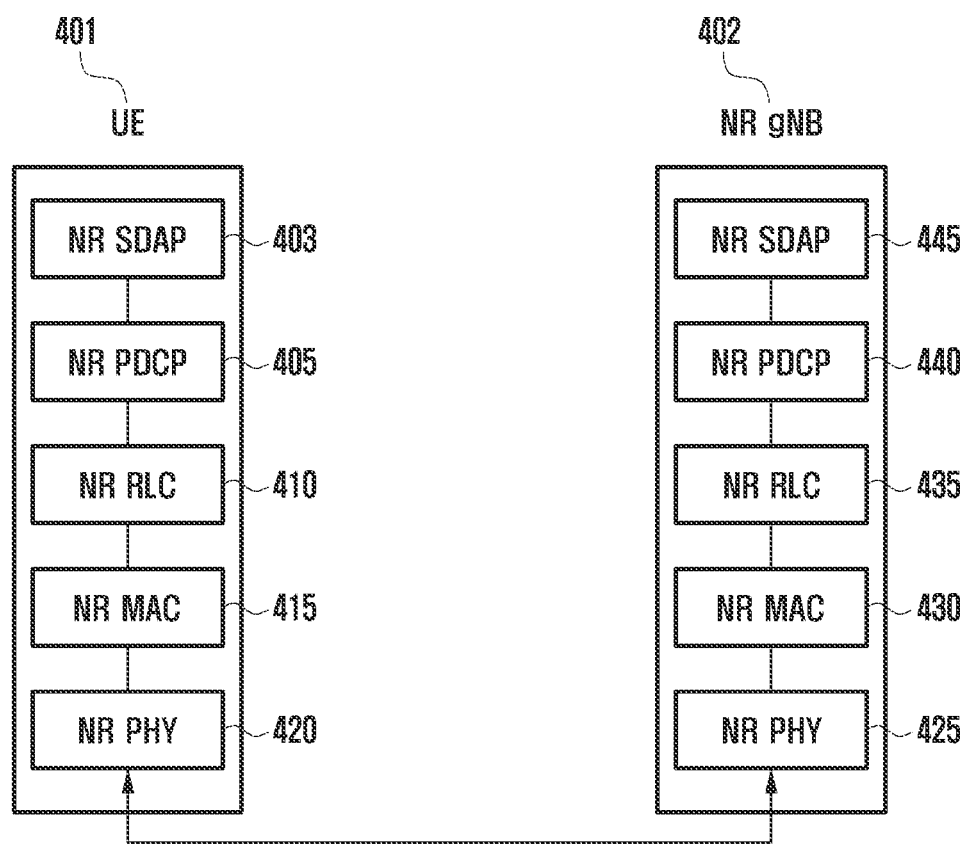
FIG. 4 is a block diagram illustrating a structure of a wireless protocol of a next-generation mobile communication system according to an embodiment of the disclosure.

FIG. 4 is a block diagram illustrating a structure of a wireless protocol of a next-generation mobile communication system according to an embodiment of the disclosure.

Referring to FIG. 4, the wireless protocol of the next-generation mobile communication system includes NR service data adaptation protocols (SDAPs) 403 and 445, NR PDCPs 405 and 440, NR RLCs 410 and 435, and NR MACs 415 and 430 in a terminal 401 and an NR base station 402, respectively.

The main functions of the NR SDAPs 403 and 445 may include some of the following functions:

Function of delivering user data (Transfer of user plane data);

Function of mapping between a QoS flow and a data bearer for both uplink and downlink (Mapping between a QoS flow and a data radio bearer (DRB) for both DL and UL);

Function of marking a QoS flow ID for both DL and UL (Marking QoS flow ID in both DL and UL packets); and Function of mapping a reflective QoS flow to a data bearer for uplink SDAP PDUs (Reflective QoS flow to DRB mapping for the UL SDAP PDUs).

In relation to an SDAP layer device, the terminal 401 may receive a radio resource control (RRC) message including a configuration of whether to use a header or function of the SDAP layer device for each PDCP layer device, bearer, or local channel. If an SDAP header is configured, through a one-bit non-access stratum (NAS) reflective QoS indicator of the SDAP header and a one-bit access stratum (AS) reflective QoS indicator thereof, the terminal 401 may be instructed to update or reconfigure information on mapping between a QoS flow of an uplink and a downlink and a data bearer. The SDAP header may include QoS flow ID information which indicates QoS. QoS information may be used as a data processing priority, scheduling information, and the like for supporting a smooth service.

The main functions of the NR PDCPs 405 and 440 may include some of the following functions:

Function of compressing and decompressing a header (Header compression and decompression: ROHC only);

Function of transmitting user data (Transfer of user data);

Sequential delivery function (In-sequence delivery of upper layer PDUs);

Non-sequential delivery function (Out-of-sequence delivery of upper layer PDUs);

Reordering function (PDCP PDU reordering for reception);

Duplicate detection function (Duplicate detection of lower layer SDUs);

Retransmission function (Retransmission of PDCP SDUs);
Function for encryption and decryption (Ciphering and deciphering); and
Timer-based SDU discard function (Timer-based SDU discard in uplink).

In the above description, the reordering function of the NR PDCPs 405 and 440 may signify a function of rearranging PDCP PDUs, received in a lower layer, in order on the basis of a PDCP sequence number (SN). The reordering function of the NR PDCPs 405 and 440 may include: a function of delivering data to a higher layer in the rearranged order; a function of directly delivering data without considering an order; a function of recording PDCP PDUs lost by rearranging an order; a function of reporting a state of the lost PDCP PDUs to a transmission side; and a function of requesting the retransmission of the lost PDCP PDUs.

The main functions of the NR RLCs 410 and 435 may include some of the following functions:

Data transmission function (Transfer of upper layer PDUs);
Sequential delivery function (In-sequence delivery of upper layer PDUs);
Non-sequential delivery function (Out-of-sequence delivery of upper layer PDUs);
ARQ function (Error Correction through ARQ);
Function for concatenation, segmentation, and reassembly (Concatenation, segmentation and reassembly of RLC SDUs);
Re-segmentation function (Re-segmentation of RLC data PDUs);
Reordering function (Reordering of RLC data PDUs);
Duplicate detection function (Duplicate detection);
Error detection function (Protocol error detection);
RLC SDU discard function (RLC SDU discard); and
RLC re-establishment function (RLC re-establishment).

In the above description, the in-sequence delivery function of the NR RLC device may signify a function of delivering RLC SDUs received from a lower layer to a higher layer in order. If multiple RLC SDUs divided from a single original RLC SDU are received, the in-sequence delivery function of the NR RLC device may include a function of reassembling and delivering the received multiple RLC SDUs.

The in-sequence delivery function of the NR RLC device may include: a function of rearranging the received RLC PDUs in order with reference to an RLC SN or a PDCP SN; a function of recording RLC PDUs lost by rearranging an order; a function of reporting a state of the lost RLC PDUs to a transmission side; and a function of requesting the retransmission of the lost RLC PDUs.

The in-sequence delivery function of the NR RLC device may include a function of delivering only the RLC SDUs before the lost RLC SDU to the higher layer in order if there is the lost RLC SDU.

The in-sequence delivery function of the NR RLC device may include a function of delivering all the received RLC SDUs to the higher layer in order before a predetermined timer starts if the predetermined timer expires although there is the lost RLC SDU.

The in-sequence delivery function of the NR RLC device may include a function of delivering all the RLC SDUs received until now to the higher layer in order if the predetermined timer expires although there is the lost RLC SDU.

The NR RLC device may process RLC PDUs in the reception order of the RLC PDUs regardless of the order of sequence numbers (out-of-sequence delivery), and may deliver the processed RLC PDUs to the NR PDCP device.

If the NR RLC device is to receive a segment, the NR RLC device may receive the segments stored in a buffer or to be later received, may reconfigure the RLC PDUs into one complete RLC PDU, and may then deliver the complete RLC PDU to the NR PDCP device.

The NR RLC layer may not include the concatenation function, and the function may be performed in the NR MAC layer or may be replaced by the multiplexing function of the NR MAC layer.

In the above description, the out-of-sequence delivery function of the NR RLC device may signify a function of directly delivering the RLC SDUs received from the lower layer to the higher layer regardless of order. If multiple RLC SDUs divided from a single original RLC SDU are received, the out-of-sequence delivery function of the NR RLC device may include a function of reassembling and delivering the received multiple RLC SDUs. The out-of-sequence delivery function of the NR RLC device may include a function of storing and reordering RLC SNs or PDCP SNs of the received RLC PDUs so as to record the lost RLC PDUs.

The NR MACs 415 and 430 may be connected to multiple NR RLC layer devices configured in one terminal, and the main functions of the NR MACs 415 and 430 may include some of the following functions:

Mapping function (Mapping between logical channels and transport channels);
Function for multiplexing and demultiplexing (Multiplexing/demultiplexing of MAC SDUs);
Function of reporting scheduling information (Scheduling information reporting);
HARQ function (Error correction through HARQ);
Function of adjusting a priority between local channels (Priority handling between logical channels of one UE);
Function of adjusting a priority between terminals (Priority handling between UEs by means of dynamic scheduling);
Function of identifying an MBMS service (MBMS service identification);
Function of selecting a transmission format (Transport format selection); and
Padding function (Padding).

The NR PHY layers 420 and 425 may channel-code and modulate higher layer data, may make the higher layer data as an OFDM symbol and may transmit the same to a radio channel, or may demodulate and channel-decode the OFDM symbol, received through the radio channel, and may deliver the demodulated and channel-decoded OFDM symbol to the higher layer.

Figure 5:
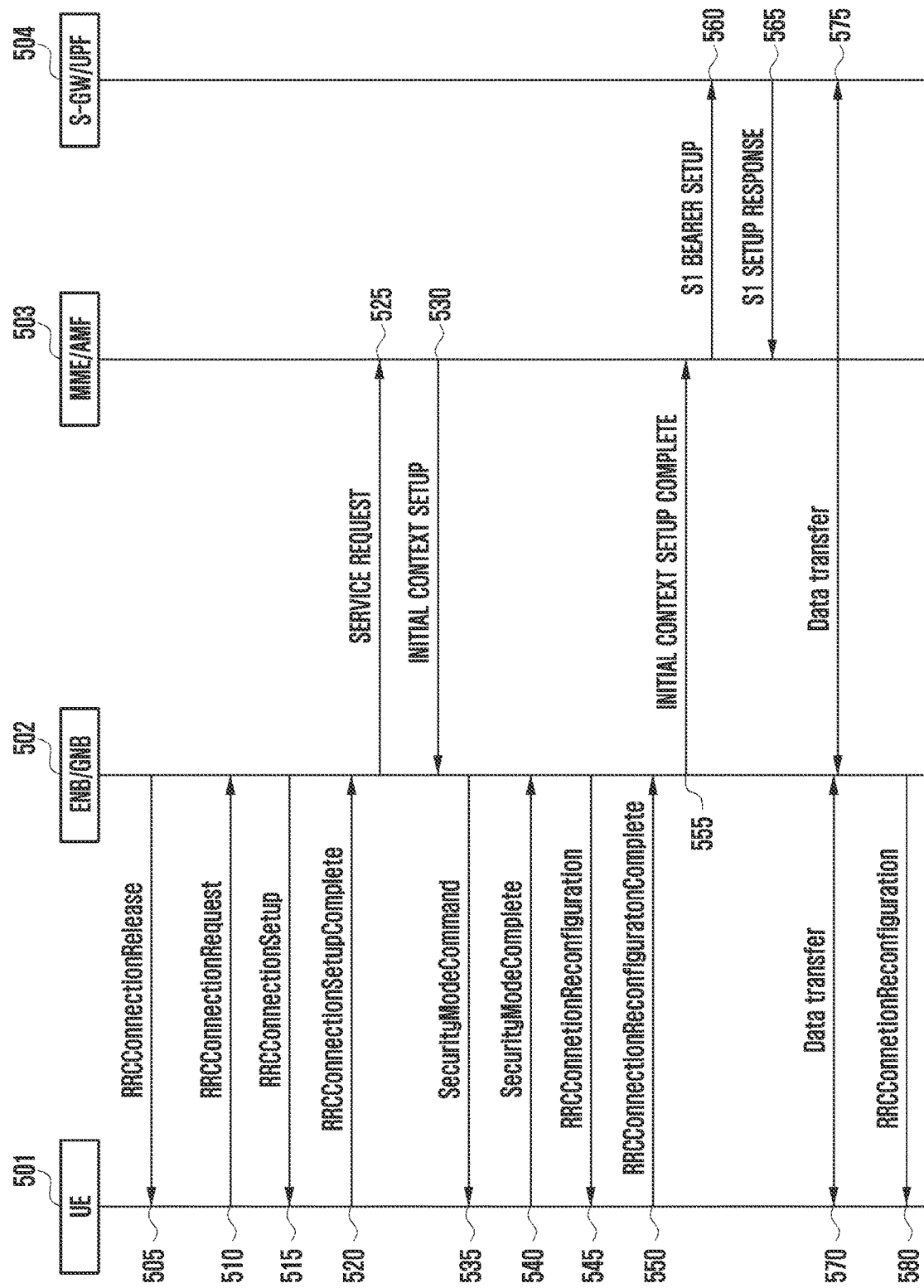
FIG. 5 is a signal flow diagram illustrating a procedure in which a base station releases a connection with a terminal so that the terminal switches from an RRC connected mode to an RRC idle mode, and a procedure in which the terminal establishes a connection with the base station so that the terminal switches from an RRC idle mode to an RRC connected mode, according to an embodiment of the disclosure.

FIG. 5 is a signal flow diagram illustrating: a procedure in which a base station 502 releases a connection with a terminal 501 so that the terminal 501 switches from an RRC connected mode to an RRC idle mode; and a procedure in which the terminal 501 establishes a connection with the base station 502 so that the terminal switches from an RRC idle mode to an RRC connected mode, according to an embodiment of the disclosure.

According to an embodiment, in operation 505, if the terminal 501 transmitting and receiving data does not transmit or receive data for a predetermined reason or for a predetermined time in the RRC connected mode, the base station 502 may transmit an RRC connection release message (RRCConnectionRelease message) to the terminal 501 so as to switch the terminal 501 to the RRC idle mode. If the terminal 501 for which no connection is currently established (hereinafter "idle mode UE") generates data to be later transmitted/received, the terminal 501 may perform an RRC connection establishment procedure with the base station 502.

In operation 510, the terminal 501 establishes uplink transmission synchronization with the base station 502 through a random access procedure, and transmits an RRC connection request message (RRCConnectionRequest message) to the base station 502. The RRCConnectionRequest message may include a reason (establishmentCause), for which a connection with an identifier of the terminal 501 is to be established, and the like.

In operation 515, the base station 502 transmits an RRC connection setup massage (RRCConnectionSetup message) so as to allow the terminal 501 to set up an RRC connection. The RRCConnectionSetup message may include RRC connection configuration information and the like. The RRC connection is also referred to as a "signaling radio bearer (SRB)", and may be used to transmit or receive an RRC message which is a control message between the terminal 501 and the base station 502.

In operation 520, the terminal 501 having set up the RRC connection transmits an RRC connection setup complete message (RRCConnetionSetupComplete message) to the base station 502. The message includes a control message called a service request that allows the terminal 501 to request an MME or an access mobility management function (AMF) 503 for a bearer setup for a predetermined service.

In operation 525, the base station 502 transmits a service request message included in the RRCConnectionSetupComplete message to the MME or AMF 503, and the MME or AMF 503 may determine whether to provide the service requested by the terminal 501.

In operation 530, if it is determined that the service requested by the terminal 501 is to be provided, the MME or AMF 503 may transmit an initial context setup request message to the base station 502.

The initial context setup request message may include information, such as QoS information to be applied during setup of a DRB and security-related information (e.g., a security key and a security algorithm) to be applied to the DRB.

In order to establish security, the base station 502 may exchange a SecurityModeCommand message (as indicated by reference numeral 535) and a SecurityModeComplete message (as indicated by reference numeral 540) with the terminal 501.

In operation 545, if the security establishment is completed, the base station 502 may transmit an RRC connection reconfiguration message (RRCConnectionReconfiguration message) to the terminal 501. The RRCConnectionReconfiguration message may include configuration information of a DRB which is to process user data. In operation 550, the terminal 501 may apply the information so as to set up the DRB, and may transmit an RRC connection reconfiguration complete message (RRCConnectionReconfigurationComplete message) to the base station 502.

In operation 555, the base station 502 having completed the DRB setup with the terminal 501 may transmit an initial context setup complete message to the MME or AMF 503. In operations 560 and 565, in order to setup an S1 bearer, the MME or AMF 503 having received the initial context setup complete message may exchange an S1 bearer setup message and an S1 bearer setup response message with an S-GW or a user plane function (UPF) 504. The S1 bearer may be a data transmission connection established between the S-GW or UPF 504 and the base station 502, and may correspond one-to-one to a DRB.

In operations 570 and 575, if all of the procedures are completed, the terminal 501 may transmit or receive data to/from the base station 502 through the S-GW or UPF 504. As described above, the normal data transmission procedure may largely include three stages: RRC connection setup; security establishment; and DRB setup.

Further, in operation 580, the base station 502 may transmit an RRCConnectionReconfiguration message to the terminal 501 so as to renew, add, or change the configuration in relation to the terminal 501 for a predetermined reason.

As described above, the terminal 501 may need multiple signaling procedures to set up an RRC connection so as to switch from an RRC idle mode to an RRC connected mode. Therefore, the next-generation mobile communication system may newly define an RRC inactive mode. As described above, in the new mode, the terminal 501 and the base station 502 may store a context of the terminal (UE AS CONTEXT), and may maintain an S1 bearer if necessary. Therefore, if an RRC inactive mode terminal attempts to reconnect to a network, the RRC inactive mode terminal performs an RRC connection resume process proposed as described below, and thus the terminal can more quickly access the network through fewer signaling procedures so as to transmit or receive data.

Figure 6:
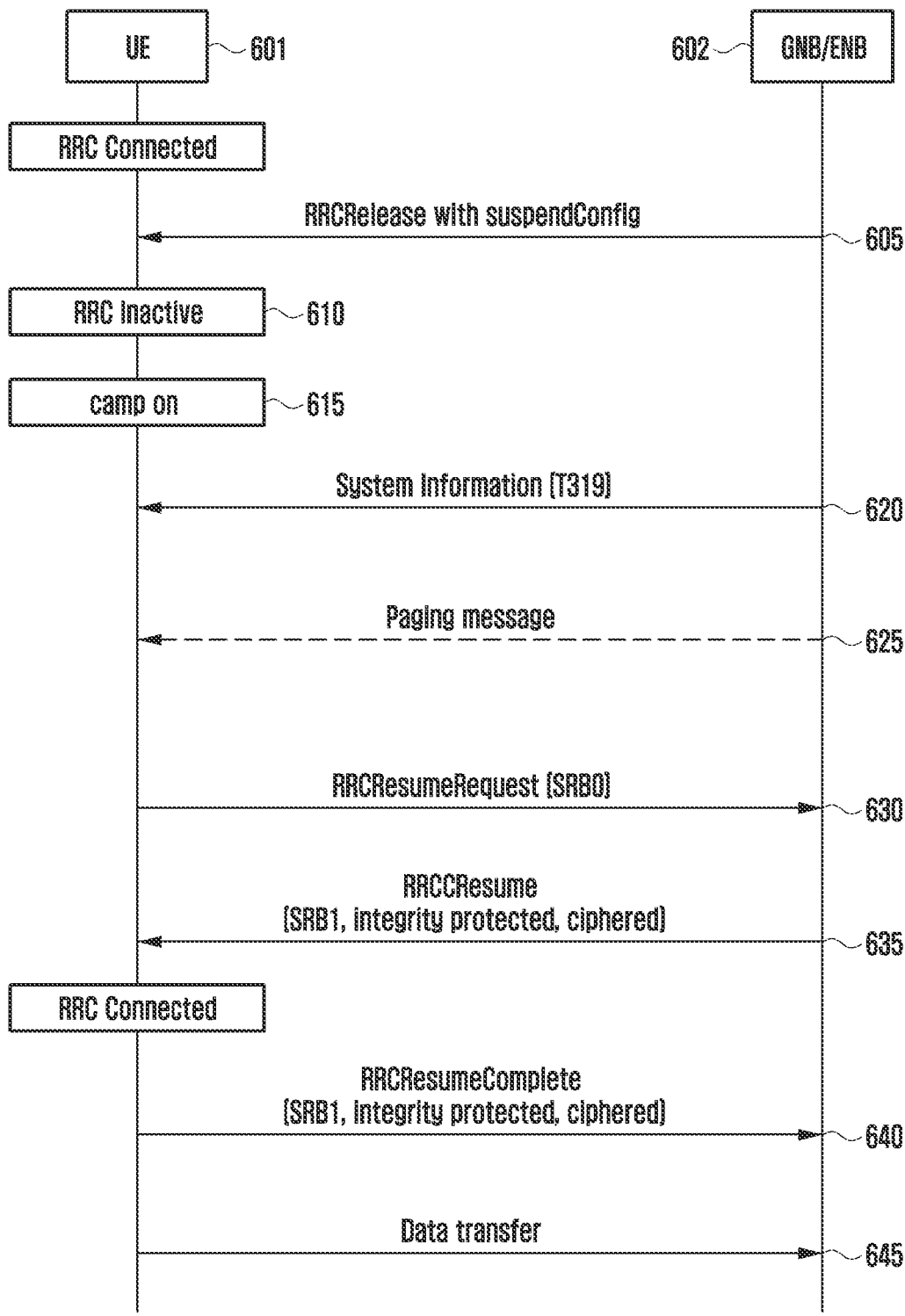
FIG. 6 is a signal flow diagram illustrating a procedure in which a base station releases a connection with a terminal so that the terminal switches from an RRC connected mode to an RRC inactive mode, and a procedure in which the terminal establishes a connection with the base station so that the terminal switches from an RRC inactive mode to an RRC connected mode, according to an embodiment of the disclosure.

FIG. 6 is a signal flow diagram illustrating: a procedure in which a base station 602 releases a connection with a terminal 601 so that the terminal 601 switches from an RRC connected mode to an RRC inactive mode; and a procedure in which the terminal 601 establishes a connection with the base station 602 so that the terminal 601 switches from an RRC inactive mode to an RRC connected mode, according to an embodiment of the disclosure.

Referring to FIG. 6, the terminal 601, together with the base station 602, may establish a connection with a network (not shown), and may transmit or receive data through the network. If the base station 602 needs to cause the terminal 601 to transition to an RRC inactive mode for a predetermined reason, the base station 602 may transmit an RRCRelease message 605 including suspend configuration information (suspendConfig) so as to cause the terminal 601 to transition to the RRC inactive mode.

If receiving the RRCRelease message 605 including the suspend configuration information, proposed operations of the terminal 601 are as follows:

1. If the RRCRelease message includes the suspend configuration information (suspendConfig), A. If a terminal connection resume identity (resumeIdentity), a NexthopChainingCount (NCC), a radio access network (RAN) paging cycle (ran-PagingCycle), and RAN notification area information (ran-NotificationAreaInfo), which have already been stored in the terminal, exist, i. The terminal may cause new values included in the suspend configuration information of the RRCRelease message to replace the stored values, or may update the stored values.

B. If the terminal connection resume identity (resumeIdentity), the NexthopChainingCount (NCC), the RAN paging cycle (ran-PagingCycle), and the RAN notification area information (ran-NotificationAreaInfo), which have already been stored in the terminal 601, do not exist, i. The terminal may store a terminal connection resume identity (resumeIdentity), a NexthopChainingCount (NCC), a RAN paging cycle (ran-PagingCycle), and RAN notification area information (ran-Notification-AreaInfo), which are included in the suspend configuration information of the RRCRelease message.

C. Further, the terminal may reset a MAC layer device. This configuration has a purpose for which, when a connection is again resumed, the terminal does not unnecessarily retransmit data stored in a HARQ buffer.

D. Further, for all SRBs and DRBs, the terminal may re-establish RLC layer devices. This configuration has a purpose for which, when a connection is again resumed, the terminal does not unnecessarily retransmit data stored in an RLC buffer and initializes variables to be later used.

E. In the above description, if the RRCRelease message having the suspend configuration information is not received as a response to an RRCResumeRequest message, i. The terminal may store a context of the terminal. The context of the terminal may include current RRC configuration information, current security context information, PDCP state information including ROHC state information, SDAP configuration information, a terminal cell identity (C-RNTI) having been used in a source cell (source PCell), and a cell identity (CellIdentity) and a physical cell identity of a source cell (PCell).

F. Further, the terminal may suspend all SRBs and DRBs except for SRB0.

G. Further, the terminal may start a T380 timer by using a value of a periodic RAN notification area update timer (periodic-RNAU-timer) included in the suspend configuration information (suspendConfig).

H. Further, the terminal may report suspension of an RRC connection to a higher layer.

I. Further, the terminal may configure lower layer devices so as to stop a function for integrity protection and encryption.

J. Further, the terminal may transition to an RRC inactive mode.

In the above description, if the RRCRelease message 605 includes carrier redirection information (redirectedCarrierInfo), when the terminal 601 having transitioned to the RRC inactive mode finds a cell 615, on which the terminal 601 is to camp, by searching for a suitable cell through execution of a cell selection procedure according to the redirectedCarrierInfo, the terminal 601 may identify system information 620 of the cell. The system information 620 includes T319 timer information and the like. If the terminal 601 fails to find a suitable cell, the terminal 601 may find a cell 615, on which the terminal 601 is to camp, by searching for a suitable cell in the indicated radio access network (RAN). If the cell 615, on which the terminal 601 is to camp, is found, the terminal 601 may identify system information 620 of the cell. If the RRCRelease message 605 does not include carrier redirection information, the terminal 601 should find a cell, on which the terminal 601 is to camp, by searching for a suitable cell in NR carriers. If the cell, on which the terminal 601 is to camp, is found, the terminal 601 may identify system information 620 of the cell.

If the terminal 601 fails to find a suitable cell by using the above-described methods so as to fail to find a cell on which the terminal 601 is to camp, the terminal 601 may search for a suitable cell through execution of a cell selection procedure on the basis of information, stored in the terminal 601, so as to find a cell 615, on which the terminal 601 is to camp. If the cell 615, on which the terminal 601 is to camp, is found, the terminal 601 may identify system information 620 of the cell 615. In the disclosure, a suitable cell may be defined as a cell satisfying the following conditions.

Suitable Cell:

A cell is considered as suitable if the following conditions are fulfilled:

The cell is part of either
the selected public land mobile network (PLMN), or
a PLMN of the equivalent PLMN list;
The cell selection criteria are fulfilled;
A cell is served by the selected/registered PLMN and not barred;
According to the latest information provided by NAS:
The cell is not barred; and
The cell is part of at least one TA that is not part of the list of "forbidden tracking areas", which belongs to a PLMN that fulfils the first bullet above.

In the disclosure, if the terminal 601 having transitioned to the RRC inactive mode camps on a suitable cell, the terminal 601 may be in a camped normally state. A terminal in a camped normally state may usually receive a general service from a network, and may perform the following operations:

Selecting and monitoring the indicated paging channels of the cell according to information sent in system information;
Monitoring relevant system information;
Performing necessary measurements for the cell reselection evaluation procedure; and
Executing the cell reselection evaluation process on the following occasions/triggers
1) UE internal triggers, so as to meet performance, and
2) If information on the broadcast control channel (BCCH) used for the cell reselection evaluation procedure has been modified.

The disclosure may propose a configuration in which, if the terminal 601 having transitioned to the RRC inactive mode fails to find a suitable cell through the above-described procedure, or if the terminal 601 camps on an acceptable cell so as to operate in an RRC connected mode and switches an RRC inactive mode, the terminal 601 finds a cell, on which the terminal 601 is to camp, by searching for an acceptable cell through execution of a cell selection procedure. That is, the configuration may be characterized in that, if the above-described conditions are satisfied, the terminal 601 having transitioned to the RRC inactive mode maintains the RRC inactive mode without transitioning to an RRC idle mode.

If the terminal 601 having transitioned to the RRC inactive mode fails to find a suitable cell according to the above-described procedure and conditions, if the RRCRelease message 605 includes carrier redirection information (redirectedCarrierInfo), the terminal 601 may find a cell 615, on which the terminal 601 is to camp, by searching for an acceptable cell through execution of a cell selection procedure according to the redirectedCarrierInfo. If the cell 615, on which the terminal 601 is to camp, is found, the terminal 601 may identify system information 620 of the cell 615. The system information 620 may include T319 timer information and the like. If the terminal 601 fails to find an acceptable cell, the terminal 601 may find a cell 615, on which the terminal 601 is to camp, by searching for an acceptable cell in the indicated RAN. If the cell 615, on which the terminal 601 is to camp, is found, the terminal 601 may identify system information 620 of the cell 615. If the RRCRelease message 605 does not include carrier redirection information, the terminal 601 should find a cell, on which the terminal 601 is to camp, by searching for an acceptable cell in NR carriers. If the cell, on which the terminal 601 is to camp, is found, the terminal 601 may identify system information 620 of the cell. If the terminal 601 fails to find an acceptable cell by using the above-described methods so as to fail to a cell on which the terminal 601 is to camp, the terminal 601 may search for an acceptable cell in all public land mobile networks (PLMNs) in any cell selection state. If a cell, on which the terminal 601 is to camp, is found, the terminal 601 may identify system information 620 of the cell. In the disclosure, an acceptable cell may be defined as a cell which can be accepted if the following conditions are satisfied.

Acceptable Cell:

An "acceptable cell" is a cell on which the UE may camp to obtain limited services (originate emergency calls and receive earthquake and tsunami warning system (ETWS) and commercial mobile alert service (CMAS) notifications). Such a cell shall fulfil the following requirements, which are the minimum set of requirements to initiate an emergency call and receive ETWS and CMAS notification in an NR network:

The cell is not barred; and
The cell selection criteria are fulfilled.

Further, in the disclosure, if the terminal 601 having transitioned to the RRC inactive mode camps on an acceptable cell, the terminal 601 may be in a camped on any cell state. The terminal 601 may be in the camped on any cell state may receive, from a network, only limited services, including an emergency call, reception of disaster information, and the like, and may perform the following operations:

Selecting and monitoring the indicated paging channels of the cell;
Monitoring relevant system information;
Performing necessary measurements for the cell reselection evaluation procedure;
Executing the cell reselection evaluation process on the following occasions/triggers
1) UE internal triggers, so as to meet performance, and
2) If information on the BCCH used for the cell reselection evaluation procedure has been modified; and
Regularly attempting to find a suitable cell trying all frequencies of all RATs that are supported by the UE. If a suitable cell is found, UE shall move to camped normally state.

If the terminal 601 in the RRC inactive mode receives, in operation 1f-25, a core network (CN) paging message while moving, the terminal 601 may transition to an RRC idle mode, and may provide notification to a non-access stratum (NAS) of the transition. If the terminal 601 in the RRC inactive mode receives, in operation 1f-25, a RAN paging message while moving, the terminal 601 may perform an RRC connection resume procedure with a base station 602.

If the terminal 601 performs a random access procedure in order to perform the RRC connection resume procedure with the base station 602 and transmits an RRCResumeRequest message to the base station 602, proposed operations of the terminal 601 in operation 1f-30 are as follows.

1. The terminal may identify system information, and if the system information indicates transmission of a complete terminal connection resume identity (I-RNTI or full resume ID), may include a stored complete terminal connection resume identity (I-RNTI) in a message so as to prepare for transmission thereof. If the system information indicates transmission of a truncated terminal connection resume identity (truncated I-RNTI or truncated resume ID), the terminal may configure a terminal connection resume identity (truncated resume ID) truncated from the stored complete terminal connection resume identity (I-RNTI) by using a predetermined method, and may include the same in a message so as to prepare for transmission thereof.
2. The terminal may reconstruct RRC connection setup information and security context information from a stored terminal context.
3. Further, the terminal may update a new KgNB security key on the basis of a current KgNB security key, a NextHop (NH) value, and a stored NCC value.
4. Further, the terminal may derive new security keys (K_RRCenc, K_RRC_int, K_UPint, and K_UPenc) to be used in an integrity protection and verification procedure and an encryption and decryption procedure by using the newly-updated KgNB security key.
5. Further, the terminal may calculate MAC-I and may include the same in a message so as to prepare for transmission thereof.
6. Further, the terminal may resume SRB1 (since an RRCResume message is to be received on SRB1, as a response to an RRCResumeRequset message to be transmitted, SRB1 should be resumed in advance).
7. The terminal may configure an RRCResumeRequset message and may deliver the same to a lower layer device.
8. The terminal may apply the updated security keys and a previously-configured algorithm to all bearers except for SRB0 so as to resume an integrity protection and verification procedure, and may apply integrity verification and protection to subsequently transmitted and received data. This configuration has a purpose for increasing the reliability and security of data subsequently transmitted or received on SRB1 or DRBs.
9. The terminal may apply the updated security keys and a previously-configured algorithm to all bearers except for SRB0 so as to resume an encryption and decryption procedure, and may apply encryption and decryption to subsequently transmitted and received data. This configuration has a purpose for increasing the reliability and security of data subsequently transmitted or received on SRB1 or DRBs.

In the above description, when the terminal 601 needs to establish a connection so as to perform a random access procedure, transmits an RRCResumeRequest message to the base station 602, and then receives an RRCResume message as a response to the RRCResumeRequest message, proposed operations of the terminal 601 in operation 635 are as follows.

1. If transmitting an RRCResumeRequest message to the base station, the terminal stops a started T319 timer.
2. Upon receiving a message, the terminal may restore a PDCP state, may reset COUNT value, and may re-establish PDCP layer devices of SRB2 and all DRBs.
3. If the message includes master cell group (masterCell-group) configuration information,
A. The terminal may perform an operation according to the master cell group configuration information included in the message, and may apply the master cell group configuration information. The master cell group configuration information may include configuration information for RLC layer devices belonging to a master cell group, a logical channel identifier, a bearer identifier, and the like.
4. If the message includes bearer configuration information (radioBearerConfig),
A. The terminal may perform an operation according to the bearer configuration information (radioBearerConfig) included in the message, and may apply the bearer configuration information. The bearer configuration information (radioBearerConfig) may include configuration information for PDCP layer devices for respective bearers, configuration information for SDAP layer devices, a logical channel identifier, a bearer identifier, and the like.
5. The terminal may resume SRB2 and all DRBs.
6 If the message includes frequency measurement configuration information (measConfig),
   A. The terminal may perform an operation according to the frequency measurement configuration information included in the message, and may apply the frequency measurement configuration information. That is, the terminal may perform frequency measurement according to a configuration.
7. The terminal may transition to an RRC connected mode.
8. The terminal may notify a higher layer device of resumption of the released RRC connection.
9. Further, in operation 640, the terminal may configure and deliver an RRCResumeComplete message for transmission of a lower layer.

Further, in operation 645, the terminal 601 may transmit or receive data to/from the base station 602.

Figure 7:
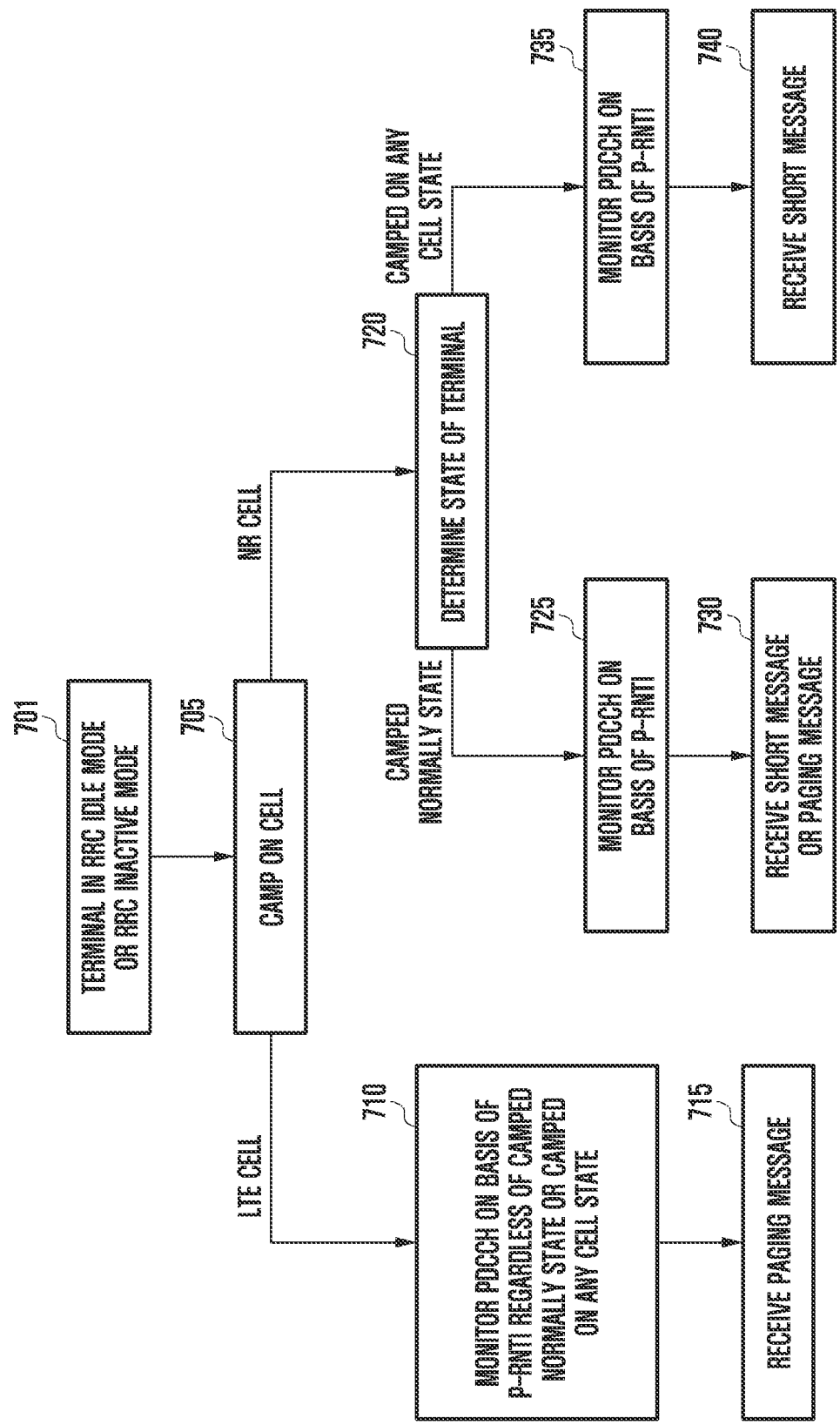
FIG. 7 is a flowchart illustrating an operation of a terminal for monitoring a short message or a paging message when the terminal is in an RRC idle mode or an RRC inactive mode according to an embodiment of the disclosure.

FIG. 7 is a flowchart illustrating an operation of a terminal for monitoring a short message or a paging message when the terminal is in an RRC idle mode or an RRC inactive mode according to an embodiment of the disclosure.

According to an embodiment, in operation 705, the terminal 701 in an RRC idle mode or an RRC inactive mode may perform a cell selection procedure or a cell reselection procedure, and thus may camp on a cell.

If the terminal 701 camps on an LTE cell in operation 705, in operation 710, the terminal 701 may receive a paging message regardless of a camped normally state or a camped on any cell state. The terminal 701 determines whether a paging message exists, by monitoring a physical downlink control channel (PDCCH) on the basis of a paging-radio network temporary identifier (P-RNTI) in a paging occasion of the terminal 701 at every discontinuous reception (DRX) cycle. If a paging message exists, in operation 715, the terminal 701 receives a paging message.

If the terminal 1g-01 camps on an NR cell in operation 705, in operation 720, the terminal 701 determines whether the terminal 701 is in a camped normally state or a camped on any cell state. If it is determined in operation 720 that the terminal 701 is in the camped normally state, in operation 725, the terminal 701 determines whether a short message or a paging message exists, by monitoring a PDCCH on the basis of a P-RNTI in a paging occasion of the terminal 701 at every DRX cycle. If a short message or a paging message exists, in operation 730, the terminal 701 receives the relevant message. The relevant message may include only a short message, may include only a paging message, or may include both a short message and a paging message. If it is determined in operation 720 that the terminal 701 is in the camped on any cell state, in operation 735, the terminal 701 determines whether a short message exists, by monitoring a PDCCH on the basis of a P-RNTI in a paging occasion of the terminal 701 at every DRX cycle. If a short message exists, in operation 740, the terminal 701 receives the short message. That is, this configuration may be characterized in that, if the terminal 701 is in the camped on any cell state, the terminal 701 does not monitor a paging message. In the disclosure, a short message may be defined as follows.

Short messages may be transmitted on a PDCCH using a P-RNTI with or without an associated paging message using a short message field in download control information (DCI)format 1_0. The Table 1 below defines short messages. Bit 1 is the most significant bit.

TABLE 1

| Bit | Short message |
| --- | --- |
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3-[8] | Not used in this release of the specification, and shall be ignored by UE if received. |

Figure 8:
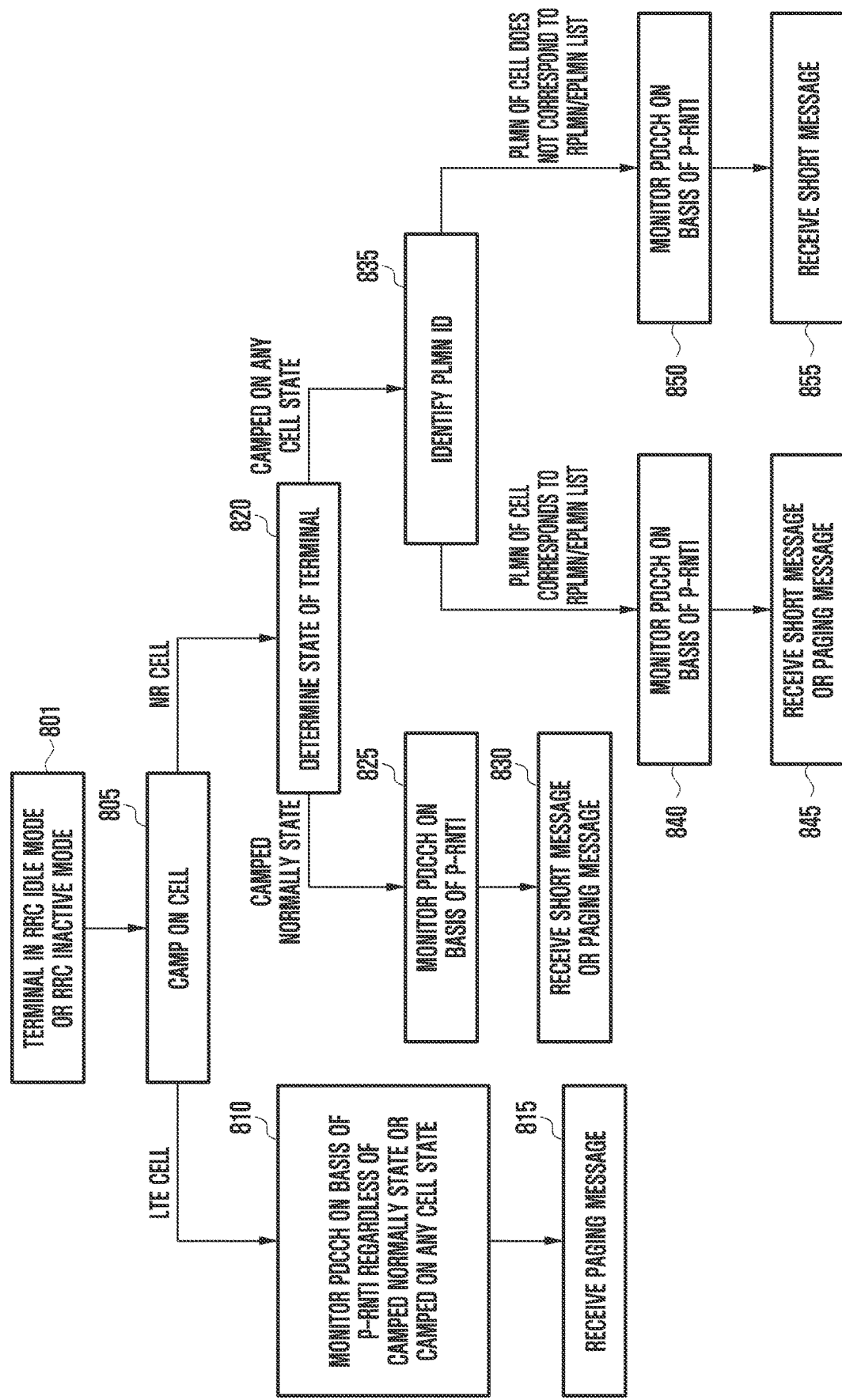
FIG. 8 is a flowchart illustrating an operation of a terminal for monitoring a short message or a paging message while the terminal is in an RRC idle mode or an RRC inactive mode according to an embodiment of the disclosure.

FIG. 8 is a flowchart illustrating an operation of a terminal for monitoring a short message or a paging message while the terminal is in an RRC idle mode or an RRC inactive mode according to an embodiment of the disclosure.

According to an embodiment, in operation 805, the terminal 801 in an RRC idle mode or an RRC inactive mode may perform a cell selection procedure or a cell reselection procedure, and thus may camp on a cell.

If the terminal 801 camps on an LTE cell in operation 805, in operation 810, the terminal 801 may receive a paging message regardless of a camped normally state or a camped on any cell state. The terminal 801 determines whether a paging message exists, by monitoring a PDCCH on the basis of a P-RNTI in a paging occasion of the terminal 801 at every DRX cycle. If a paging message exists, in operation 815, the terminal 801 receives a paging message.

If the terminal 801 camps on an NR cell in operation 805, in operation 820, the terminal 801 determines whether the terminal 801 is in a camped normally state or a camped on any cell state. If it is determined in operation 820 that the terminal 1h-01 is in the camped normally state, in operation 825, the terminal 801 determines whether a short message or a paging message exists, by monitoring a PDCCH on the basis of a P-RNTI in a paging occasion of the terminal 801 at every DRX cycle. If a short message or a paging message exists, in operation 830, the terminal 801 receives the relevant message. The relevant message may include only a short message, may include only a paging message, or may include both a short message and a paging message. If it is determined in operation 820 that the terminal 801 is in the camped on any cell state, in operation 835, the terminal 801 determines whether a PLMN of the relevant cell corresponds to a registered PLMN (RPLMN) list or an equivalent PLMN (EPLMN) list. If the PLMN of the relevant cell corresponds to an RPLMN list or an EPLMN list, in operation 840, the terminal 801 determines whether a short message or a paging message exists, by monitoring a PDCCH on the basis of a P-RNTI in a paging occasion of the terminal 801 at every DRX cycle. If a short message or a paging message exists, in operation 845, the terminal 801 receives the relevant message. The relevant message may include only a short message, may include only a paging message, or may include both a short message and a paging message. If the PLMN of the relevant cell does not correspond to an RPLMN list or an EPLMN list 835, in operation 850, the terminal 801 determines whether a short message exists, by monitoring a PDCCH on the basis of a P-RNTI in a paging occasion of the terminal 801 at every DRX cycle. If a short message exists, in operation 855, the terminal 801 receives the relevant message.

Figure 9:
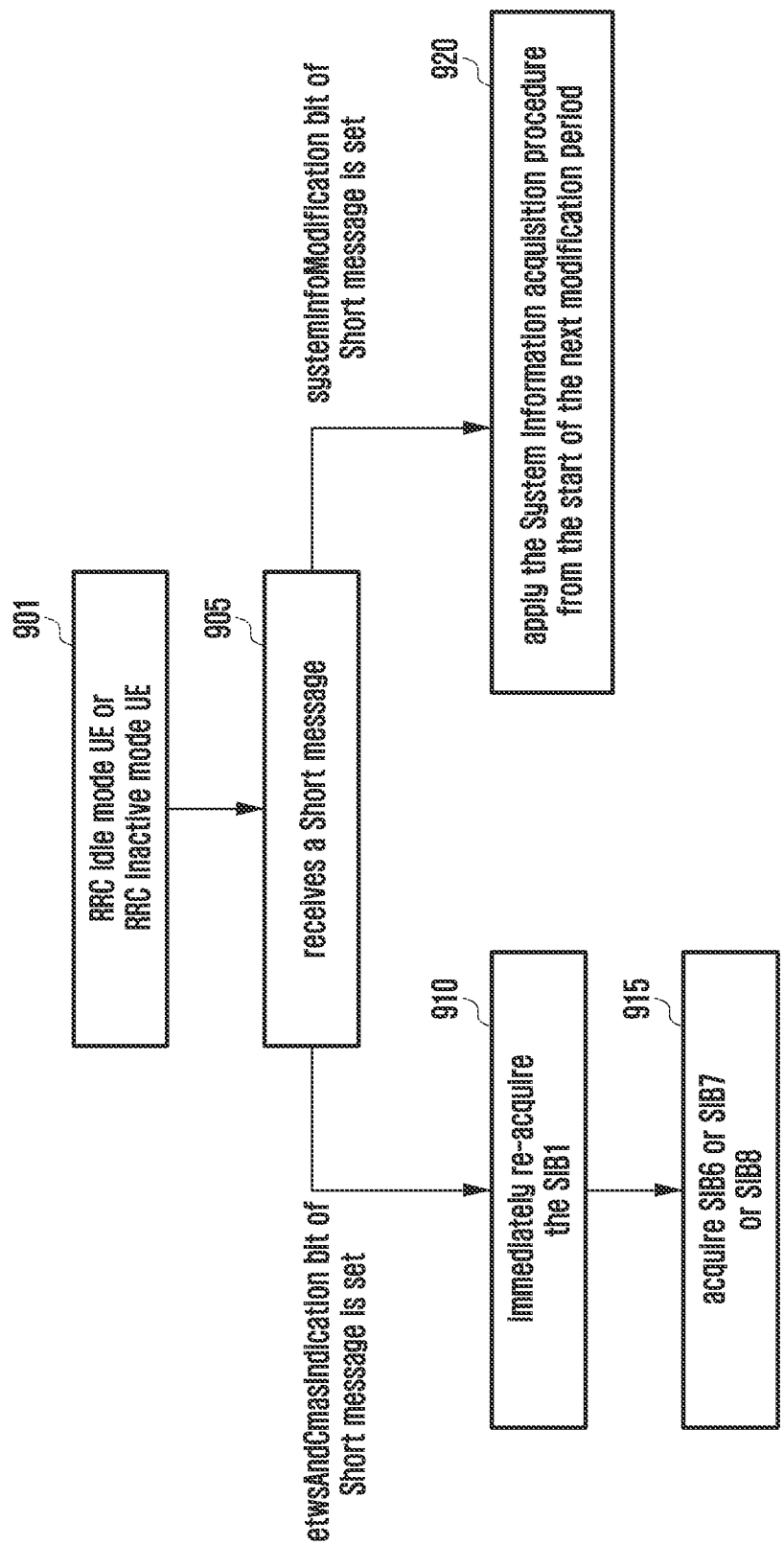
FIG. 9 is a flowchart illustrating an operation of a terminal when receiving a short message while the terminal is in an RRC idle mode or an RRC inactive mode according to an embodiment of the disclosure.

FIG. 9 is a flowchart illustrating an operation of a terminal when receiving a short message while the terminal is in an RRC idle mode or an RRC inactive mode according to an embodiment of the disclosure.

According to an embodiment, in operation 905, the terminal 901 in an RRC idle mode or an RRC inactive mode may receive a short message from a cell on which the terminal 901 camps. When the terminal 901 receives a short message in operation 905, in operation 910, if the relevant message includes a bit named "earthquake and tsunami warning system and commercial mobile alert service (etwsAndCmasIndication)" set to 1, the terminal 901 may immediately and newly identify SIB1 from the relevant cell. If system information scheduling information (si-SchedulingInfo) included in the received SIB1 includes scheduling information of SIB6, SIB7, or SIB8 in operation 1i-10, in operation 915, the terminal 1i-01 may identify SIB6, SIB7, or SIBS. When the terminal 901 receives a short message in operation 905, if the relevant message includes a systemInfoModification bit set to 1, in operation 920, the terminal 901 performs a procedure for identifying system information from a start point of a next modification period.

Figure 10:
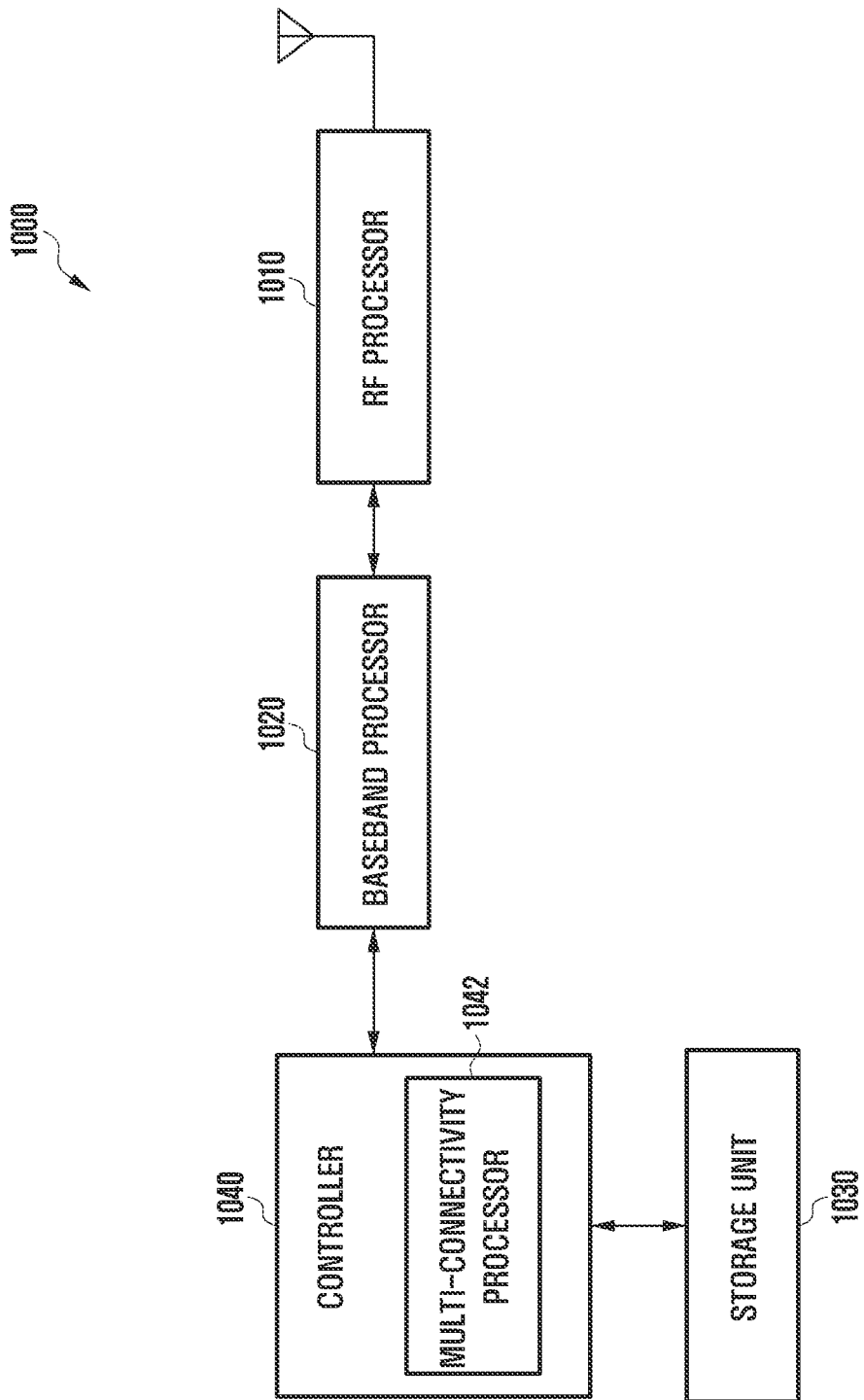
FIG. 10 is a block diagram illustrating a configuration of a terminal according to an embodiment of the disclosure.

FIG. 10 is a block diagram illustrating a configuration of a terminal according to an embodiment of the disclosure.

The terminal 1000 may include a radio frequency (RF) processor 1010, a baseband processor 1020, a storage unit 1030, a controller 1040, and a transceiver (not shown).

The RF processor 1010 according to an embodiment may serve to transmit or receive a signal through a wireless channel, such as band conversion and amplification of a signal. That is, the RF processor 1010 may up-convert a baseband signal provided by the baseband processor 1j-20 into an RF band signal and may then transmit the RF band signal through an antenna and may down-convert an RF band signal received through the antenna into a baseband signal. For example, the RF processor 1010 may include a transmission filter, a reception filter, an amplifier, a mixer, an oscillator, a digital-to-analog converter (DAC), an analog-to-digital converter (ADC), or the like.

Referring to FIG. 10, FIG. 10 illustrates only one antenna, but the terminal may be provided with multiple antennas.

Also, the RF processor 1010 may include multiple RF chains. Further, the RF processor 1010 may perform beamforming. For the beamforming, the RF processor 1010 may adjust a phase and a magnitude of each of the signals transmitted or received through multiple antennas or antenna elements. Further, the RF processor 1010 may perform MIMO and may receive multiple layers during execution of a MIMO operation. The RF processor 1010 may perform reception beam sweeping by appropriately configuring the multiple antennas or antenna elements under the control of the controller 1040, or may adjust the direction and beam width of a reception beam so that the reception beam is coordinated with a transmission beam.

The baseband processor 1020 may perform a conversion function between a baseband signal and a bit stream according to a physical layer standard of a system. For example, when data is transmitted, the baseband processor 1020 may generate complex symbols by encoding and modulating a transmission bit stream. Further, when data is received, the baseband processor 1020 may reconstruct a received bit stream by demodulating and decoding the baseband signal provided by the RF processor 1010. For example, according to an orthogonal frequency division multiplexing (OFDM) scheme, when data is transmitted, the baseband processor 1020 may generate complex symbols by encoding and modulating a transmission bit stream, may map the complex symbols to subcarriers, and may then perform an inverse fast Fourier transform (IFFT) operation and a cyclic prefix (CP) insertion to configure OFDM symbols. Further, when data is received, the baseband processor 1020 may divide the baseband signal provided by the RF processor 1010 in an OFDM symbol unit, may reconstruct the signals mapped to the subcarriers by a fast Fourier transform (FFT), and may then reconstruct a received bit stream by the demodulation and decoding.

The baseband processor 1020 and the RF processor 1010 may transmit and receive a signal as described above. Therefore, the baseband processor 1020 and the RF processor 1010 may be referred to as a "transmitter", a "receiver", a "transceiver", or a "communication unit". Also, at least one of the baseband processor 1020 and the RF processor 1010 may include multiple communication modules in order to support multiple different radio access technologies (RATs). Further, at least one of the baseband processor 1020 and the RF processor 1010 may include different communication modules in order to process signals in different frequency bands. For example, the different RATs may include an LTE network, an NR network, and the like. The different frequency bands may include a super high frequency (SHF) (e.g., 2.2 GHz and 2 GHz) band and an mmWave (e.g., 60 GHz) band.

The storage unit 1030 may store data such as basic programs, application programs, and configuration information for an operation of the terminal. Also, the storage unit 1030 may provide the stored data in response to a request of the controller 1j-40.

The controller 1040 may control overall operations of the terminal. For example, the controller 1040 may transmit or receive a signal through the baseband processor 1020 and the RF processor 1010. Further, the controller 1040 may record and read data in and from the storage unit 1040. To this end, the controller 1040 may include at least one processor. For example, the controller 1040 may include a multi-connectivity processor 1042 configured to control multiple connections, a communication processor (CP) configured to perform a control for communication and an application processor (AP) configured to control a higher layer such as an application program.

Alternatively, the transceiver may be implemented as a transmitter and a receiver, and each component may be implemented through one or more processors. The transceiver is configured to receive and transmit signal, data and control information associated with paging monitoring method or reporting a connection setup failure method.

The controller 1040 is configured to identify the UE is in a camped on any cell state or a camped normally state, monitor a short message in case that the UE is in the camped on any cell state, and monitor a short message and a paging message in case that the UE is in the camped normally state.

The camped on any cell state is only applicable for RRC_IDLE state.

The camped normally state is applicable for RRC_IDLE and RRC_INACTIVE state.

The short message is received on a physical downlink control channel (PDCCH) using paging radio network temporary identifier (P-RNTI).

The short message is received via downlink control information (DCI) with or without scheduling information for the paging message.

Figure 11:
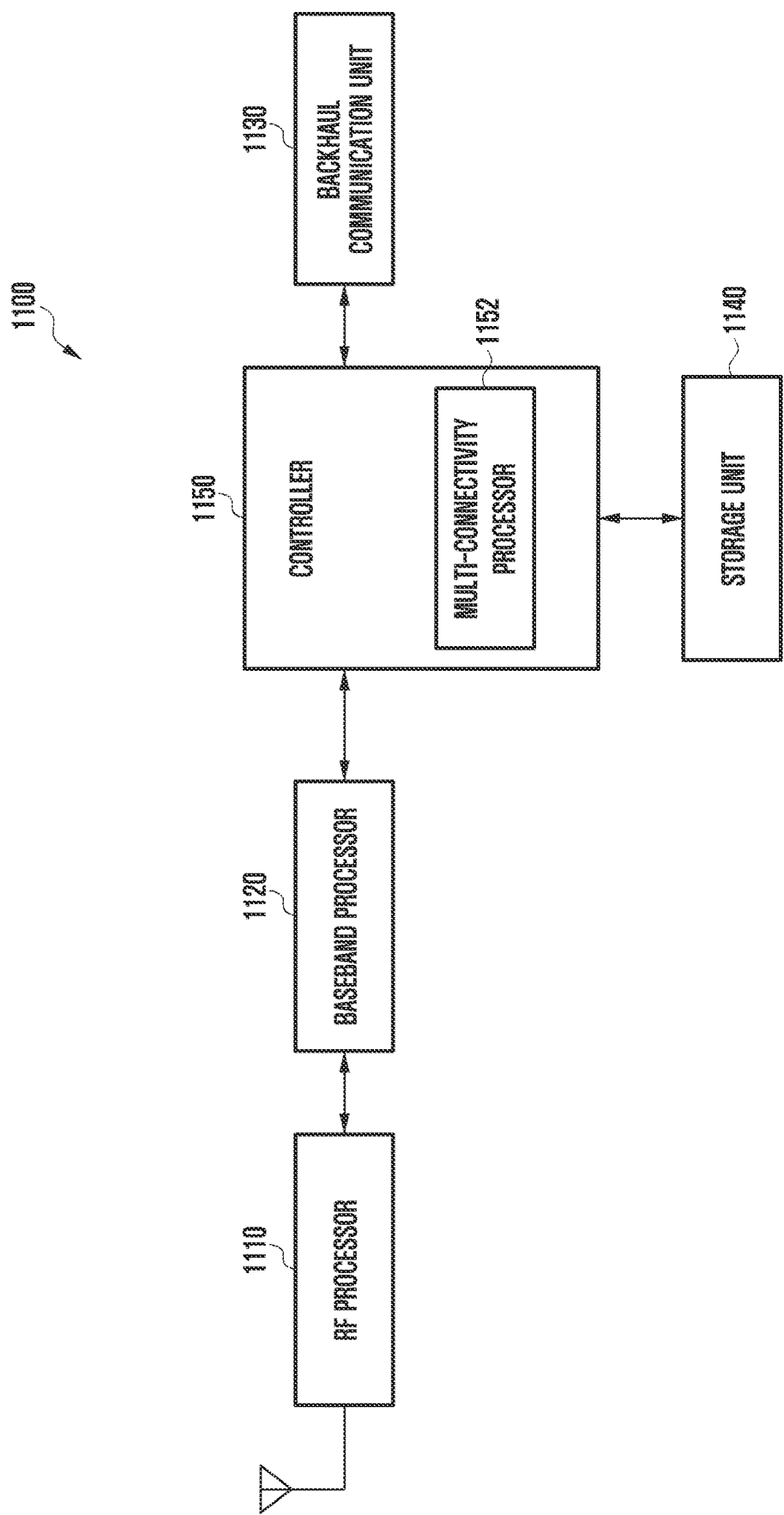
FIG. 11 is a block diagram illustrating a configuration of a base station according to an embodiment of the disclosure.

FIG. 11 is a block diagram illustrating a configuration of a base station according to an embodiment of the disclosure.

The base station 1100 according to an embodiment may include at least one transmission reception point (TRP).

The base station 1100 according to an embodiment may include an RF processor 1110, a baseband processor 1120, a backhaul communication unit 1130, a storage unit 1140, a controller 1150, and a transceiver (not shown).

The RF processor 1110 may serve to transmit or receive a signal through a wireless channel, such as band conversion and amplification of a signal. That is, the RF processor 1110 may up-convert a baseband signal provided by the baseband processor 1120 into an RF band signal and may then transmit the RF band signal through an antenna and may down-convert an RF band signal received through the antenna into a baseband signal. For example, the RF processor 1110 may include a transmission filter, a reception filter, an amplifier, a mixer, an oscillator, a DAC, an ADC, or the like.

Referring to FIG. 11, FIG. 11 illustrates only one antenna 1160 but the base station may be provided with multiple antennas.

Also, the RF processor 1110 may include multiple RF chains. Further, the RF processor 1110 may perform beamforming. For the beamforming, the RF processor 1110 may adjust a phase and a magnitude of each of the signals transmitted or received through multiple antennas or antenna elements. The RF processor 1110 may be configured to transmit one or more layers for a downlink MIMO operation.

The baseband processor 1120 may perform a conversion function between a baseband signal and a bit stream according to a physical layer standard of first radio access technology. For example, when data is transmitted, the baseband processor 1120 may generate complex symbols by encoding and modulating a transmission bit stream. Further, when data is received, the baseband processor 1120 may reconstruct a received bit stream by demodulating and decoding the baseband signal provided by the RF processor 1110. For example, according to an OFDM scheme, when data is transmitted, the baseband processor 1120 may generate complex symbols by encoding and modulating a transmission bit stream, may map the complex symbols to subcarriers, and may then perform an IFFT operation and a CP insertion to configure OFDM symbols. Further, when data is received, the baseband processor 1120 may divide the baseband signal provided by the RF processor 1110 in an OFDM symbol unit, may reconstruct the signals mapped to the subcarriers by a fast Fourier transform (FFT) operation, and may then reconstruct a received bit stream by the modulation and decoding. The baseband processor 1120 and the RF processor 1110 may transmit and receive signals as described above.

Accordingly, the baseband processor 1120 and the RF processor 1110 may be referred to as a "transmitter", a "receiver", a "transceiver", a "communication unit", or a "wireless communication unit".

The backhaul communication unit 1130 may provide an interface for communication with other nodes in a network.

The storage unit 1140 may store data such as basic programs, application programs, and configuration information for an operation of the primary base station. In particular, the storage unit 1140 may store information on the bearers allocated to accessed terminals, measurement results reported by the accessed terminals, and the like. Also, the storage unit 1140 may store the information which becomes a standard of determination of whether to provide or stop providing multi-connectivity to a terminal. Further, the storage unit 1140 may provide the stored data according to a request of the controller 1150.

The controller 1150 may control overall operations of the primary base station. For example, the controller 1150 may transmit or receive a signal through the baseband processor 1120 and the RF processor 1110, or through the backhaul communication unit 1130. Further, the controller 1150 records and reads data in and from the storage unit 1140. To this end, the controller 1150 may include at least one processor, such as a multi-connectivity processor 1152 configured to control multiple connections, a CP configured to perform a control for communication and an AP configured to control a higher layer such as an application program.

Alternatively, the transceiver may be implemented as a transmitter and a receiver, and each component may be implemented through one or more processors.

The transceiver is configured to receive and transmit signal, data and control information associated with paging monitoring method or reporting a connection setup failure method.

The controller 1150 is configured to identify whether to transmit a short message and scheduling information for a paging message, control the transceiver to transmit, to a user equipment (UE), the short message on a physical downlink control channel (PDCCH) using paging radio network temporary identifier (P-RNTI) based on the identification, and control the transceiver to transmit, to the UE, the paging message based on the scheduling information in case that the scheduling information is identified to transmit.

The short message is monitored by the UE in a camped on any cell state, and the short message and the paging message are monitored by the UE in a camped normally state.

The camped on any cell state is only applicable for RRC_IDLE state.

The camped normally state is applicable for RRC_IDLE and RRC_INACTIVE state.

The short message is transmitted via downlink control information (DCI) with or without the scheduling information for the paging message.

Second Embodiment

Figure 12:
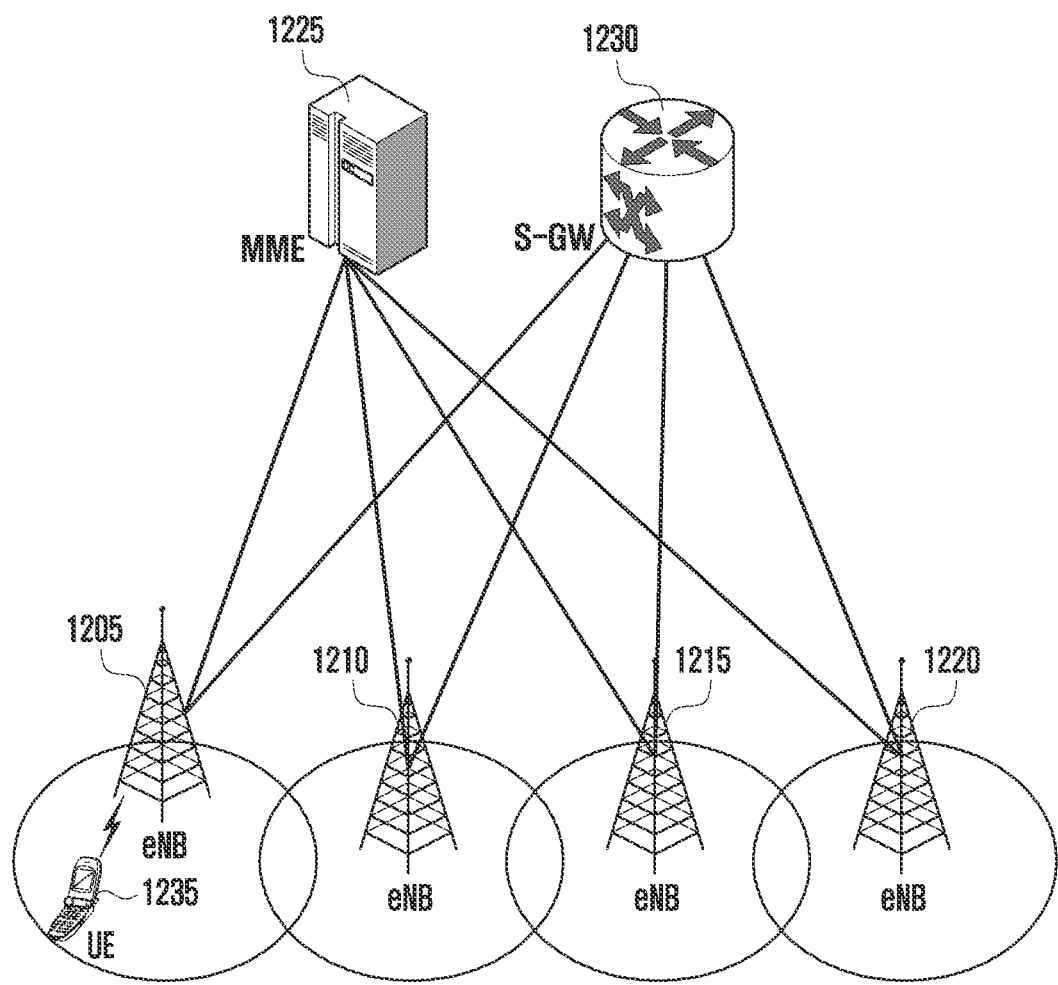
FIG. 12 is a view illustrating an architecture of an LTE system according to an embodiment of the disclosure.

FIG. 12 is a view illustrating an architecture of an LTE system according to an embodiment of the disclosure.

Referring to FIG. 12, the wireless communication system includes multiple base stations 1205, 1210, 1215, and 1220, a mobility management entity (MME) 1225, and a serving-gateway (S-GW) 1230. A user equipment (hereinafter a "UE" or a "terminal") 1235 accesses an external network through the base stations 1205, 1210, 1215, and 1220 and the S-GW 1230.

The base stations 1205, 1210, 1215, and 1220 are access nodes of a cellular network and provide radio access to the terminals connected to the network. That is, in order to serve traffic of users, the base stations 1205, 1210, 1215, and 1220 collect and schedule pieces of state information such as buffer states, available transmission power states, and channel states of the terminals to support the connection between the terminals and a core network (CN) (not shown). The MME 1225 is an apparatus configured to take charge of various control functions as well as a mobility management function for a terminal and is connected to multiple base stations, and the S-GW 1230 is an apparatus configured to provide a data bearer. Further, the MME 1225 and the S-GW 1230 may further perform authentication, bearer management, and the like on the terminal connected to the network and may process packets which have been received from the base stations 1205, 1210, 1215, and 1220 or are to be delivered to the base stations 1205, 1210, 1215, and 1220.

Figure 13:
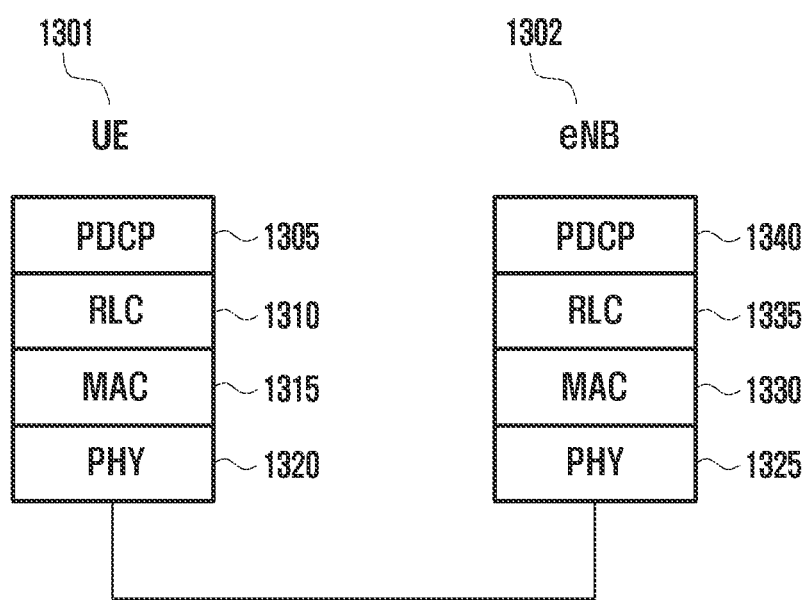
FIG. 13 is a view illustrating a wireless protocol structure of an existing LTE system according to an embodiment of the disclosure.

FIG. 13 is a view illustrating a wireless protocol structure of an LTE system according to an embodiment of the disclosure.

Referring to FIG. 13, a wireless protocol of the LTE system includes packet data convergence protocols (PDCPs) 13-05 and 1340, radio link controls (RLCs) 1310 and 1335, and medium access controls (MACs) 1315 and 1330 in a terminal 1301 and a base station 1302, respectively. The PDCPs 1305 and 1340 take charge of operations such as compression/recovery of an IP header. The main functions of the PDCPs 1305 and 1340 are summarized as follows:

Function of compressing and decompressing a header (Header compression and decompression: ROHC only);
Function of transmitting user data;
Sequential delivery function (In-sequence delivery of upper layer PDUs at PDCP re-establishment procedure for RLC AM);
Reordering function (For split bearers in DC (only support for RLC AM): PDCP PDU routing for transmission and PDCP PDU reordering for reception);
Duplicate detection function (Duplicate detection of lower layer SDUs at PDCP re-establishment procedure for RLC AM);
Retransmission function (Retransmission of PDCP SDUs at handover and, for split bearers in DC, of PDCP PDUs at PDCP data-recovery procedure, for RLC AM);
Function for encryption and decryption (Ciphering and deciphering); and
Timer-based SDU discard function (Timer-based SDU discard in uplink).

The RLCs 1310 and 1335 reconfigure a PDCP protocol data unit (PDU) to a suitable size so as to perform an automatic repeat request (ARQ) operation and the like. The main functions of the RLCs 1310 and 1335 are summarized as follows:

Data transmission function (Transfer of upper layer PDUs);
ARQ function (Error correction through ARQ (only for AM data transfer));
Function for concatenation, segmentation, and reassembly (Concatenation, segmentation, and reassembly of RLC SDUs (only for UM and AM data transfer));
Re-segmentation function (Re-segmentation of RLC data PDUs (only for AM data transfer));
Reordering function (Reordering of RLC data PDUs (only for UM and AM data transfer);
Duplicate detection function (Duplicate detection (only for UM and AM data transfer));
Error detection function (Protocol error detection (only for AM data transfer));
RLC SDU discard function (RLC SDU discard (only for UM and AM data transfer)); and
RLC re-establishment function (RLC re-establishment).

The MACs 1315 and 1330 are connected to multiple RLC layer devices configured in one terminal, and multiplex RLC PDUs into MAC PDUs and demultiplex RLC PDUs from MAC PDUs. The main functions of the MACs 1315 and 1330 are summarized as follows:

Mapping function (Mapping between logical channels and transport channels);
Function for multiplexing and demultiplexing (Multiplexing/demultiplexing of MAC SDUs belonging to one or different logical channels into/from transport blocks (TBs) delivered to/from the physical layer on transport channels);
Function of reporting scheduling information;
HARQ function (Error correction through HARQ);
Function of adjusting a priority between local channels (Priority handling between logical channels of one UE);
Function of adjusting a priority between terminals (Priority handling between UEs by means of dynamic scheduling);
Function of identifying an MBMS service (MBMS service identification);
Function of selecting a transmission format (Transport format selection); and
Padding function (Padding).

The PHY layers 1320 and 1325 channel-code and modulate higher layer data into OFDM symbols and transmit the OFDM symbols through a wireless channel, or demodulate and channel-decode OFDM symbols, received through a wireless channel, into higher layer data and deliver the higher layer data to a higher layer.

Although not illustrated in FIG. 13, RRC layers exist as higher layers of the PDCP layers of the terminal 1301 and the base station 1302, respectively, and the RRC layers may exchange access and measurement-related configuration control messages in order to control radio resources.

Figure 14:
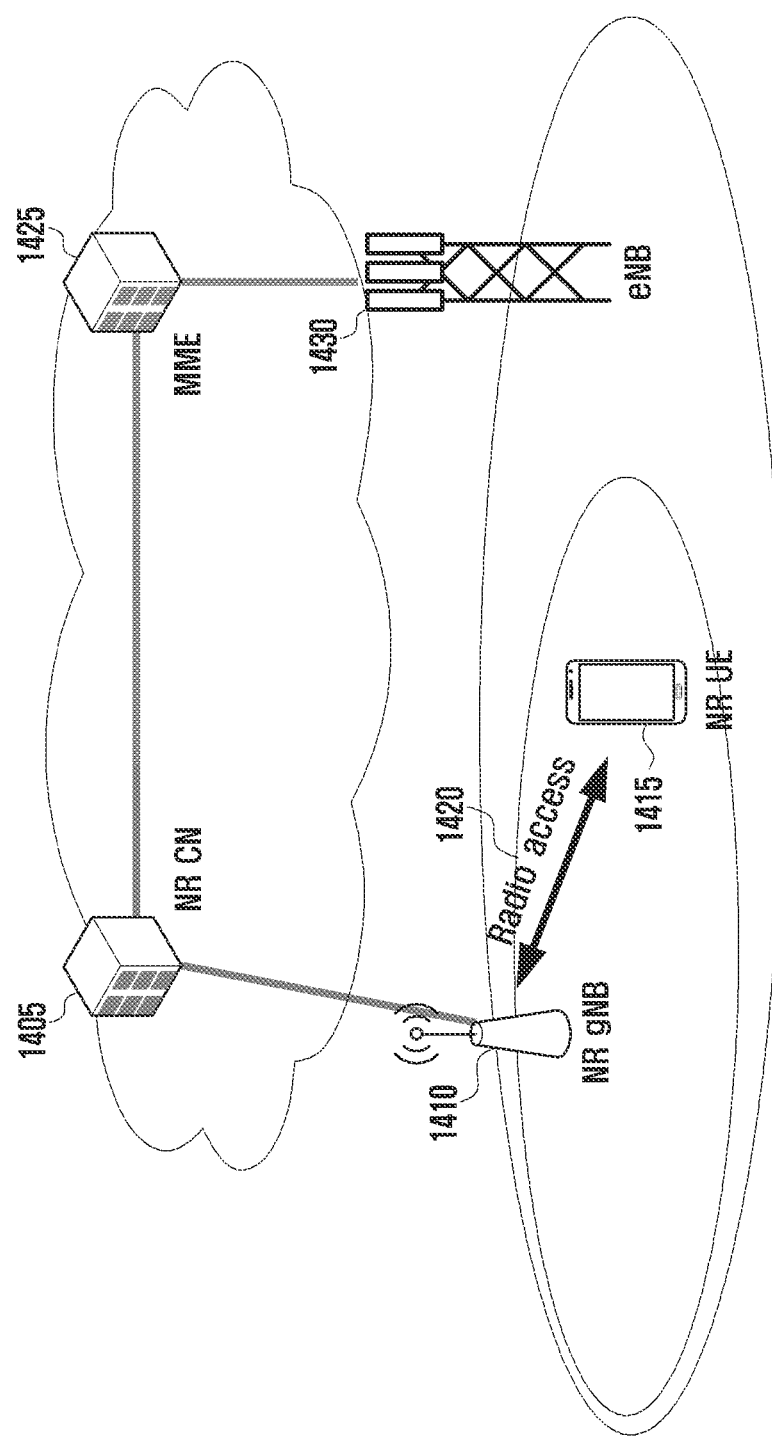
FIG. 14 is a view illustrating a structure of a next-generation mobile communication system according to an embodiment of the disclosure.

FIG. 14 is a view illustrating a structure of a next-generation mobile communication system according to an embodiment of the disclosure.

Referring to FIG. 14, a radio access network of the next-generation mobile communication system includes a next-generation base station (NR Node B, hereinafter "NR gNB" or "NR base station") 1410 and an NR core network (NR CN) 1405. A user equipment (NR user equipment) (hereinafter "NR UE" or "terminal") 1415 accesses an external network through the NR gNB 1410 and the NR CN 1405.

In FIG. 14, the NR gNB 1410 corresponds to an evolved Node B (eNB) of the existing LTE system. The NR gNB 1410 is connected to the NR UE 1415 through a wireless channel and may provide a service superior to that provided by the existing Node B. In the next-generation mobile communication system, since all user traffics are served through shared channels, there is a need for an apparatus configured to collect pieces of state information, including buffer states, available transmission power states, channel states, and the like of UEs so as to perform scheduling, and the NR gNB 1410 serves as the apparatus. One NR gNB 1410 usually controls multiple cells, and includes: a central unit (CU) configured to direct control and signaling; and a distributed unit (DU) configured to take charge of transmission/reception of a signal. In order to achieve ultra-high-speed data transmission in comparison to the LTE system, the next-generation mobile communication system may have an existing maximum bandwidth or more, and may use an orthogonal frequency division multiplexing (hereinafter, referred to as "OFDM") scheme as radio access technology, and beamforming technology may be additionally combined therewith. Further, an adaptive modulation and coding (hereinafter, referred to as "AMC") scheme for determining a modulation scheme and a channel coding rate so as to match a channel state of a terminal is applied. The NR CN 1405 performs functions, including mobility support, bearer establishment, quality of service (QoS) configuration, and the like. The NR CN 1405 is an apparatus configured to perform various control functions including a mobility management function for a terminal, and is connected to multiple base stations. Further, the next-generation mobile communication system may interwork with the LTE system, and the NR CN 1405 is connected to an MME 1425 of the LTE system through a network interface. The MME 1425 is connected to an eNB 1430 which is an existing base station.

Figure 15:
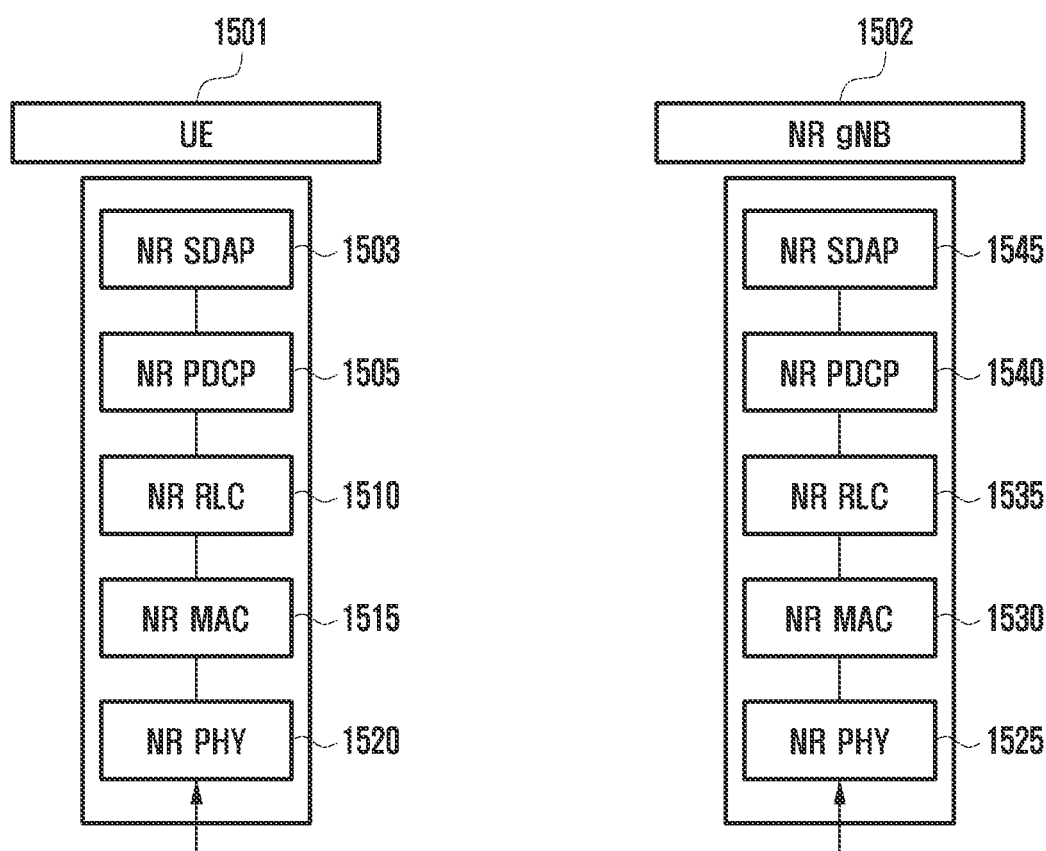
FIG. 15 is a block diagram illustrating a structure of a wireless protocol of a next-generation mobile communication system according to an embodiment of the disclosure.

FIG. 15 is a block diagram illustrating a structure of a wireless protocol of a next-generation mobile communication system according to an embodiment the disclosure.

Referring to FIG. 15, the wireless protocol of the next-generation mobile communication system includes NR service data adaptation protocols (SDAPs) 1503 and 1545, NR PDCPs 1505 and 1540, NR RLCs 1510 and 1535, and NR MACs 1515 and 1530 in a terminal 1501 and an NR base station 1502, respectively.

The main functions of the NR SDAPs 1503 and 1545 may include some of the following functions:
- Function of delivering user data (Transfer of user plane data);
- Function of mapping between a QoS flow and a data bearer for both uplink and downlink (Mapping between a QoS flow and a data radio bearer (DRB) for both DL and UL);
- Function of marking a QoS flow ID for both uplink and downlink (Marking QoS flow ID in both DL and UL packets); and
- Function of mapping a reflective QoS flow to a data bearer for uplink SDAP PDUs (Reflective QoS flow to DRB mapping for the UL SDAP PDUs).

In relation to an SDAP layer device, a terminal may receive a radio resource control (RRC) message including a configuration of whether to use a header or function of the SDAP layer device for each PDCP layer device, bearer, or local channel. If an SDAP header is configured, through a one-bit non-access stratum (NAS) reflective QoS indicator of the SDAP header and a one-bit access stratum (AS) reflective QoS indicator thereof, the terminal may be instructed to update or reconfigure information on mapping between a QoS flow of an uplink and a downlink and a data bearer. The SDAP header may include QoS flow ID information which indicates QoS. QoS information may be used as a data processing priority, scheduling information, and the like for supporting a smooth service.

The main functions of the NR PDCPs 2*d*-05 and 2*d*-40 may include some of the following functions:
- Function of compressing and decompressing a header (Header compression and decompression: ROHC only);
- Function of transmitting user data (Transfer of user data);
- Sequential delivery function (In-sequence delivery of upper layer PDUs);
- Non-sequential delivery function (Out-of-sequence delivery of upper layer PDUs);
- Reordering function (PDCP PDU reordering for reception);
- Duplicate detection function (Duplicate detection of lower layer SDUs);
- Retransmission function (Retransmission of PDCP SDUs);
- Function for encryption and decryption (Ciphering and deciphering); and
- Timer-based SDU discard function (Timer-based SDU discard in uplink).

In the above description, the reordering function of the NR PDCPs 1505 and 1540 may refer to a function of rearranging PDCP PDUs, received in a lower layer, in order on the basis of a PDCP sequence number (SN), and may include: a function of delivering data to a higher layer in the rearranged order; a function of directly delivering data without considering an order; a function of recording PDCP PDUs lost by rearranging an order; a function of reporting a state of the lost PDCP PDUs to a transmission side; and a function of requesting the retransmission of the lost PDCP PDUs.

The main functions of the NR RLCs 1510 and 1535 may include some of the following functions:
- Data transmission function (Transfer of upper layer PDUs);
- Sequential delivery function (In-sequence delivery of upper layer PDUs);
- Non-sequential delivery function (Out-of-sequence delivery of upper layer PDUs);
- ARQ function (Error Correction through ARQ);
- Function for concatenation, segmentation, and reassembly (Concatenation, segmentation and reassembly of RLC SDUs);
- Re-segmentation function (Re-segmentation of RLC data PDUs);
- Reordering function (Reordering of RLC data PDUs);
- Duplicate detection function (Duplicate detection);
- Error detection function (Protocol error detection);
- RLC SDU discard function (RLC SDU discard); and
- RLC re-establishment function (RLC re-establishment).

In the above description, the in-sequence delivery function of the NR RLC device may refer to a function of delivering RLC SDUs received from a lower layer to a higher layer in order, and if multiple RLC SDUs divided from a single original RLC SDU are received, may include: a function of reassembling and delivering the received multiple RLC SDUs; a function of rearranging the received RLC PDUs in order with reference to an RLC SN or a PDCP SN; a function of recording RLC PDUs lost by rearranging an order; a function of reporting a state of the lost RLC PDUs to a transmission side; and a function of requesting the retransmission of the lost RLC PDUs. The in-sequence delivery function of the NR RLC device may include a function of delivering only the RLC SDUs before the lost RLC SDU to the higher layer in order if there is the lost RLC SDU. Alternatively, the in-sequence delivery function of the NR RLC device may include a function of delivering all the received RLC SDUs to the higher layer in order before a predetermined timer starts if the timer expires although there is the lost RLC SDU. Alternatively, the in-sequence delivery function of the NR RLC device may include a function of delivering all the RLC SDUs received until now to the higher layer in order if the predetermined timer expires although there is the lost RLC SDU. Further, in the above description, the NR RLC device may process RLC PDUs in the reception order of the RLC PDUs (regardless of the order of sequence numbers and in the arrival order of the RLC PDUs), and may deliver the processed RLC PDUs to the PDCP device regardless of the order of the sequence numbers (out-of-sequence delivery). In the case of a segment, the NR RLC device may receive the segments stored in a buffer or to be later received, may reconfigure the RLC PDUs into one complete RLC PDU, may process the complete RLC PDU, and may then deliver the processed complete RLC PDU to the PDCP device. The NR RLC layer may not include the concatenation function, and the function may be performed in the NR MAC layer or may be replaced by the multiplexing function of the NR MAC layer.

In the above description, the out-of-sequence delivery function of the NR RLC device may refer to a function of directly delivering the RLC SDUs received from the lower layer to the higher layer regardless of order, and if multiple RLC SDUs divided from a single original RLC SDU are received, may include: a function of reassembling and delivering the received multiple RLC SDUs; and a function of storing and reordering RLC SNs or PDCP SNs of the received RLC PDUs so as to record the lost RLC PDUs.

The NR MACs 1515 and 1530 may be connected to multiple NR RLC layer devices configured in one terminal, and the main functions of the NR MACs 1515 and 1530 may include some of the following functions:

Mapping function (Mapping between logical channels and transport channels);

Function for multiplexing and demultiplexing (Multiplexing/demultiplexing of MAC SDUs);

Function of reporting scheduling information (Scheduling information reporting);

HARQ function (Error correction through HARQ);

Function of adjusting a priority between local channels (Priority handling between logical channels of one UE);

Function of adjusting a priority between terminals (Priority handling between UEs by means of dynamic scheduling);

Function of identifying an MBMS service (MBMS service identification);

Function of selecting a transmission format (Transport format selection); and

Padding function (Padding).

The NR PHY layers 1520 and 1525 may channel-code and modulate higher layer data, may make the higher layer data as an OFDM symbol and may transmit the same to a radio channel, or may demodulate and channel-decode the OFDM symbol, received through the radio channel, and may deliver the demodulated and channel-decoded OFDM symbol to the higher layer.

The T300 described below may be replaced by all types of timers which are started when a terminal delivers a connection establishment request message in an idle state and are stopped when the terminal receives a connection establishment message or a connection reject message from a base station as a response to the connection establishment request message, when a cell is reselected, or when a higher layer stops the connection establishment. Further, the T319 may be replaced by all types of timers which are started when a terminal delivers a connection resume request message in an inactive stage and are stopped when the terminal receives, from the base station, a connection establishment message, an RRC release message, an RRCRelease with suspendConfig message, or an RRCReject message as a response to the connection resume request message, when a cell is reselected, or when a higher layer stops the connection establishment.

Figure 16:
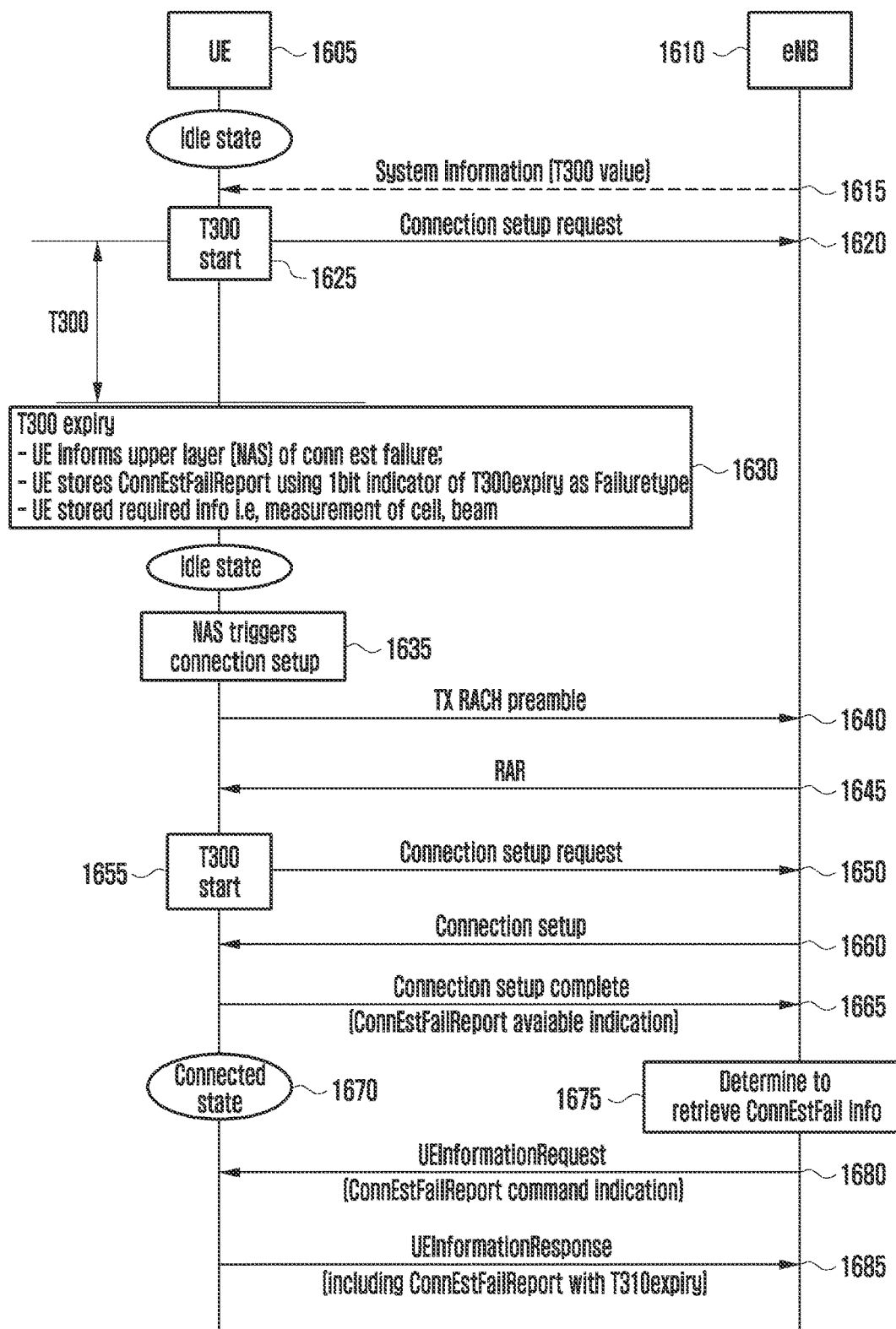
FIG. 16 is a signal flow diagram illustrating a case in which, when a terminal transitions from an idle state to a connected state, the terminal fails to transition from the former to the latter, according to an embodiment of the disclosure.

FIG. 16 is a signal flow diagram illustrating a case in which, when a terminal transitions from an idle state to a connected state, the terminal fails to transition from the former to the latter, according to an embodiment the disclosure.

Referring to FIG. 16, the terminal 1605 is switched from a previous connected state to an idle state, or attempts initial access from an idle state. In operation 1615, the terminal 1605 may receive system information, through a base station 1610 has set a value of a T300, from base station 2e-10. While the terminal 1605 attempts to set up a connection and delivers a connection setup message to the base station 1610 in operation 1620, the terminal 1605 starts an internal T300 timer in operation 1625. In operation 1630, if the T300 timer expires, the terminal 1605 notifies a higher layer or a NAS layer that the attempt to set up a connection has failed, and stores a connection setup failure report in the terminal 1605. In this example, the stored information is a failure type, and an indicator, which indicates T300 expiry or a connection setup failure, may be stored. Further, the terminal 1605 may store: an ID (a global cell ID or a physical cell ID) of a cell for which the setup attempt by the terminal 1605 has failed during the setup attempt; location information of the terminal 1605 at a time point at which the setup attempt by the terminal 1605 has failed; a measurement value of a signal strength, a measurement value of a beam, and index information of the relevant beam, which are related to the cell for which the setup attempt by the terminal 1605 has failed; a measurement value of a signal strength, a measurement value of a beam, and index information of the relevant beam, which are related to a neighboring cell; the number of preambles transmitted for random access, and index information of a beam for transmission of a preamble; information on whether a collision with another random access terminal has occurred; a maximum transmission power value at the time of random access; time required to succeed in setting up a reconnection after the failure; a measurement value of a signal strength of a cell of another RAT; and information on the number of consecutive failures when the terminal 1605 attempts to set up or resume a connection with the particular cell. A failure type indicator therein has a length of 1 bit. The number of consecutive failures is initialized whenever a cell, with which the terminal 1605 attempts to set up a connection, is reselected and changed, and increases if an attempt to set up a connection with the same cell by the terminal 1605 consecutively fails.

Even after T300 expiry, the terminal 1605 is also in an idle state. Then, in operation 1635, the terminal 1605 may again request, for connection setup, a higher layer of the terminal 1605, a lower layer (NAS layer), or an AS layer. In operation 1640, the terminal 1605 transmits a random access preamble, and when the random access preamble is successfully transmitted, receives a random access response (RAR) from the base station 1610 in operation 1645. Then, in operation 1650, the terminal 1605 retransmits a connection setup request message to the base station 1610, and simultaneously, starts the T300 timer in operation 1655. If the terminal 1605 receives, in operation 1660, a connection setup message from the base station 1610 before expiry of a T300 timer, in operation 1665, the terminal 1605 includes an indicator, which indicates that it is possible to report a connection setup failure, in a connection setup complete message and delivers the connection setup complete message to the base station 1610. Simultaneously with transmission of the connection setup complete message, in operation 1670, the terminal 1605 transitions to a connected state. If the base station 1610 having received and recognized the indicator indicating that it is possible to report a connection setup failure determines, in operation 1675, that the base station is to receive a relevant connection setup failure report from the terminal 1605, in operation 1680, the base station 1610 includes a request indication, which indicates transmission of a connection setup failure report, in a UEInformationRequest message and delivers the UEInformationRequest message to the terminal 1605. In operation 1685, the terminal 1605 having received the UEInformationRequest message includes the recently-stored connection setup failure report in a UEInformationResponse message and delivers the UEInformationResponse message to the base station 1610. The connection setup failure report has been stored in the terminal 1605 at the time of expiry of the T300 timer in operation 1630, and may include the expiry of the T300 timer or a failure factor indicator of a connection setup failure. The indicator, which indicates that it is possible to report a connection setup failure and is transmitted by the terminal 1605 in operation 1665, may be included in an RRCConnectionSetupComplete message, an RRCReconfigurationComplete message, an RRC ReestablishmentComplete message, or an RRCResumeComplete message.

Figure 17:
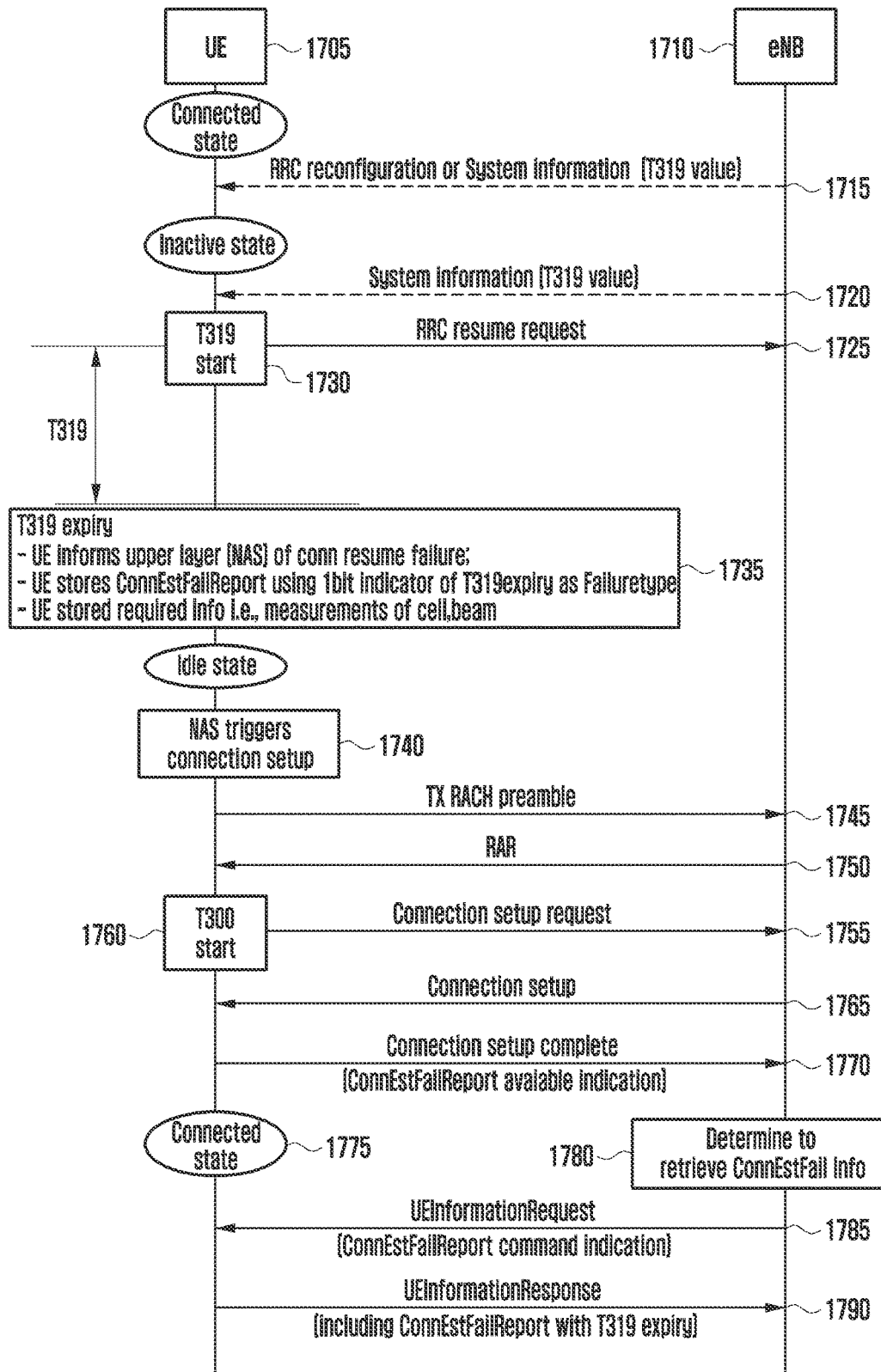
FIG. 17 is a flow diagram illustrating a case in which, when a terminal transitions from an inactive state to a connected state, the terminal fails to transition from the former to the latter, according to an embodiment of the disclosure.

FIG. 17 is a flow diagram illustrating a case in which, when a terminal transitions from an inactive state to a connected state, the terminal fails to transition from the former to the latter, according to an embodiment the disclosure.

Referring to FIG. 17, the terminal 1705 is in a situation in which the terminal 1705 transitions from a previous connected state to an inactive state. In this example, in operation 1715, a value of a T319 timer may have been received through RRC dedicated signaling or system information from a serving base station 1710 when the terminal 1705 has previously been in a connected state, or, in operation 1720, may be received through system information from a base station 1710 on which the terminal 1705 camps in an inactive state. While the terminal 1705 attempts to resume an RRC connection and delivers an RRC connection resume message to the base station 1710 in operation 1725, in operation 1730, the terminal 1705 starts an internal T319 timer. In operation 1735, if the T319 timer expires in operation 1735, the terminal 1705 notifies a higher layer or a NAS layer that the attempt to resume a connection has failed, and stores a connection setup failure report in the terminal 1705. In this example, the stored information is a failure type, and an indicator, which indicates T319 expiry or a connection resumption failure, may be stored. Further, the terminal 1705 may store: an ID (a global cell ID or a physical cell ID) of a cell for which the connection resumption attempt by the terminal 1705 has failed during the connection resumption attempt; location information of the terminal 1705 at a time point at which the connection resumption attempt by the terminal 1705 has failed; a measurement value of a signal strength, a measurement value of a beam, and index information of the relevant beam, which are related to the cell for which the connection resumption attempt by the terminal 1705 has failed; a measurement value of a signal strength, a measurement value of a beam, and index information of the relevant beam, which are related to a neighboring cell; the number of preambles transmitted for random access, and index information of a beam for transmission of a preamble; information on whether a collision with another random access terminal has occurred; a maximum transmission power value at the time of random access; time required to succeed in setting up a reconnection after the failure; a measurement value of a signal strength of a cell of another RAT; and information on the number of consecutive failures when the terminal 1705 attempts to set up or resume a connection with the particular cell. A failure type indicator therein has a length of 1 bit. The number of consecutive failures is initialized whenever a cell, with which the terminal 1705 attempts to set up or resume a connection, is reselected and changed, and increases if an attempt to set up or resume a connection with the same cell by the terminal 1705 consecutively fails.

After the T319 timer expires, the terminal 1705 transitions from the inactive state to an idle state.

Then, in operation 1740, the terminal 1705 may again request, for connection setup, a higher layer of the terminal 1705, a lower layer (NAS layer), or an AS layer. In operation 1745, the terminal 1705 transmits a random access preamble, and when the random access preamble is successfully transmitted, receives a random access response (RAR) from the base station 2f-10 in operation 2f-45. Then, in operation 1755, the terminal 1705 retransmits a connection setup request message to the base station 1710, and simultaneously, starts the T300 timer this time in operation 1760. If the terminal 1705 receives, in operation 1765, a connection setup message from the base station 1710 before expiry of a T310 timer, in operation 1770, the terminal 1705 includes an indicator, which indicates that it is possible to report a connection setup failure, in a connection setup complete message and delivers the connection setup complete message to the base station 1710. Simultaneously with transmission of the connection setup complete message, in operation 1775, the terminal 1705 transitions to a connected state. If the base station 1710 having received and recognized the indicator indicating that it is possible to report a connection setup failure determines, in operation 1780, that the base station is to receive a relevant connection setup failure report from the terminal 1705, in operation 1785, the base station 1710 includes a request indication, which indicates transmission of a connection setup failure report, in a UEInformationRequest message and delivers the UEInformationRequest message to the terminal 1705. In operation 1790, the terminal 1705 having received the UEInformationRequest message includes the recently-stored connection setup failure report in a UEInformationResponse message and delivers the UEInformationResponse message to the base station 1710. The connection setup failure report has been stored in the terminal 1705 at the time of expiry of the T319 timer in operation 1735, and may include the expiry of the T319 timer or a failure factor indicator of a connection setup failure. The indicator, which indicates that it is possible to report a connection setup failure and is transmitted by the terminal 1705 in operation 1770, may be included in an RRCConnectionSetupComplete message, an RRCReconfigurationComplete message, an RRC ReestablishmentComplete message, or an RRCResumeComplete message.

Figure 18:
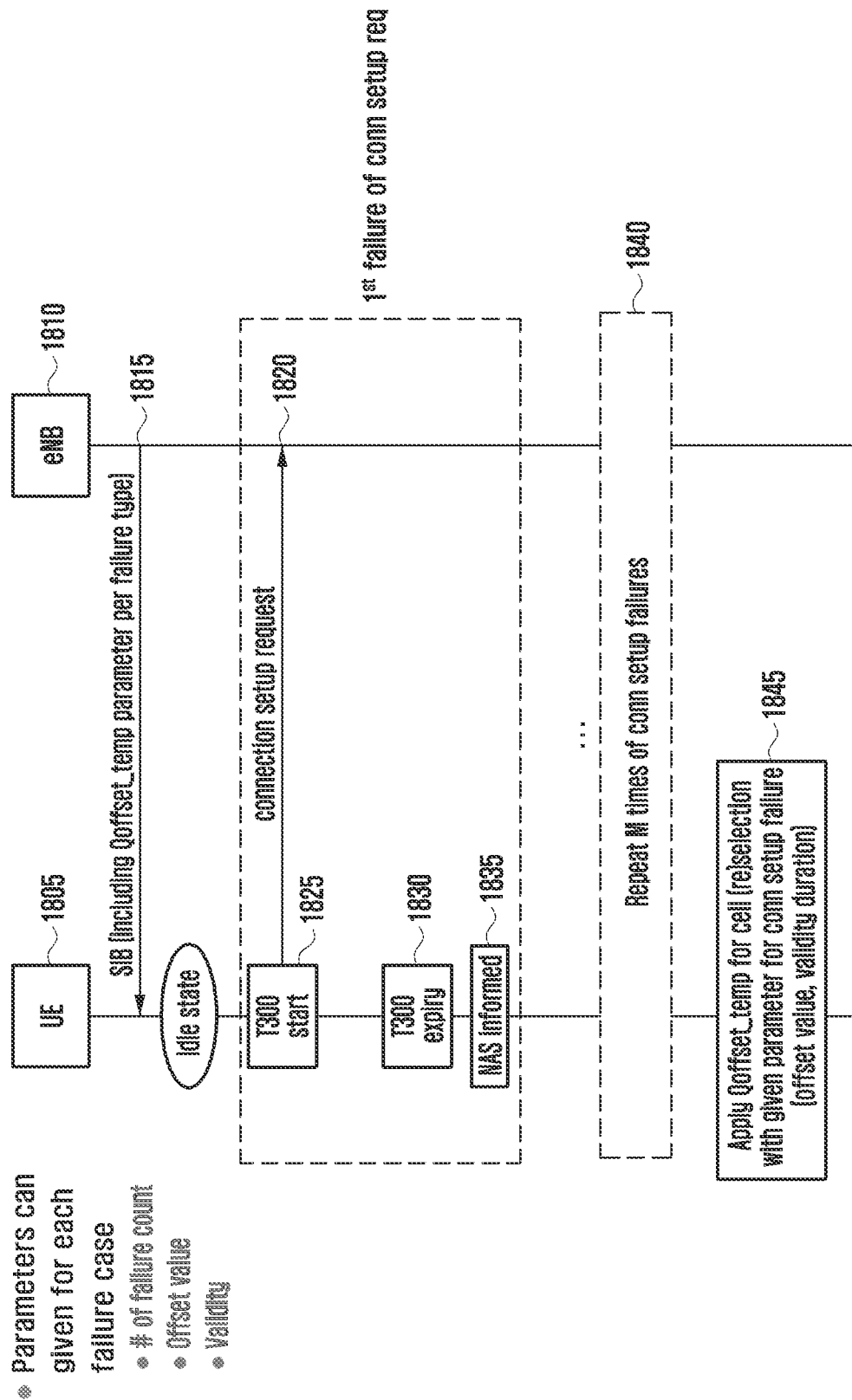
FIG. 18 is a signal flow diagram illustrating an operation of a terminal for (re-)selecting a cell by applying a predetermined power offset and a predetermined factor value if the terminal experiences a fixed number of failures when the terminal transitions from an idle state to a connected state, according to an embodiment of the disclosure.

FIG. 18 is a signal flow diagram illustrating an operation of a terminal for (re-)selecting a cell by applying a predetermined power offset and a predetermined factor value if the terminal experiences a fixed number of failures when the terminal transitions from an idle state to a connected state, according to an embodiment the disclosure.

The terminal 1805 is in an idle state. If the terminal 18-05 has previously been in a connected state, the terminal 1805 may have received a Qoffset_temp-related factor according to a connection failure type through system information or RRC dedicated signaling from a serving base station 1810. Alternatively, in operation 1815, if the terminal 1805 has previously been in an idle state not in the connected state, the terminal 1805 may have received a Qoffset_temp-related factor according to a connection failure type through system information from a base station 1810 of a cell on which the terminal 1805 has camped.

In this example, as Qoffset_temp-related factors, for each connection failure type, the number of relevant consecutive connection failures; a Qoffset_temp value which is a power offset value to be used during cell (re-)selection; and information on a period during which cell (re-)selection is to be performed by using the power offset value may be delivered. Each connection failure type may be expiry of a T300 timer or expiry of a T319 timer. If the same type of consecutive failures for the same cell occur by the above-described given number, the terminal 2g-05 performs a cell (re-)selection operation, to which a Qoffset_temp value defined in the corresponding type of connection failure case is applied, during a period defined in the corresponding type of connection failure case.

While the terminal 1805 desires connection setup and delivers, in operation 1820, a connection setup request message to the base station 1810 on which the terminal 1805 camps, in operation 1825, the terminal 1805 starts the timer T300. If the T300 timer expires in operation 1830, the terminal 1805 notifies a NAS layer or a higher layer of a connection setup failure. Then, in operation 1840, it is assumed that the terminal 1805 repeats M times an operation of again receiving a connection setup request from the NAS layer, starting the T300 timer, transmitting a connection setup request message to the same cell, and causing the T300 timer to expire again. If the pieces of information received in operation 1815 are as follows: when the T300 timer expires, the number of consecutive connection failures: M+1, Qoffset_temp: K (dB), and a validity period: 100 ms; and when the T319 timer expires, the number of consecutive connection failures: N+1, Qoffset_temp: L (dB), and a validity period: 50 ms, after operation 1840, at operation 1845, the terminal 1805 performs cell (re-)selection by using K as the value of Qoffset_temp for 100 ms.

Figure 19:
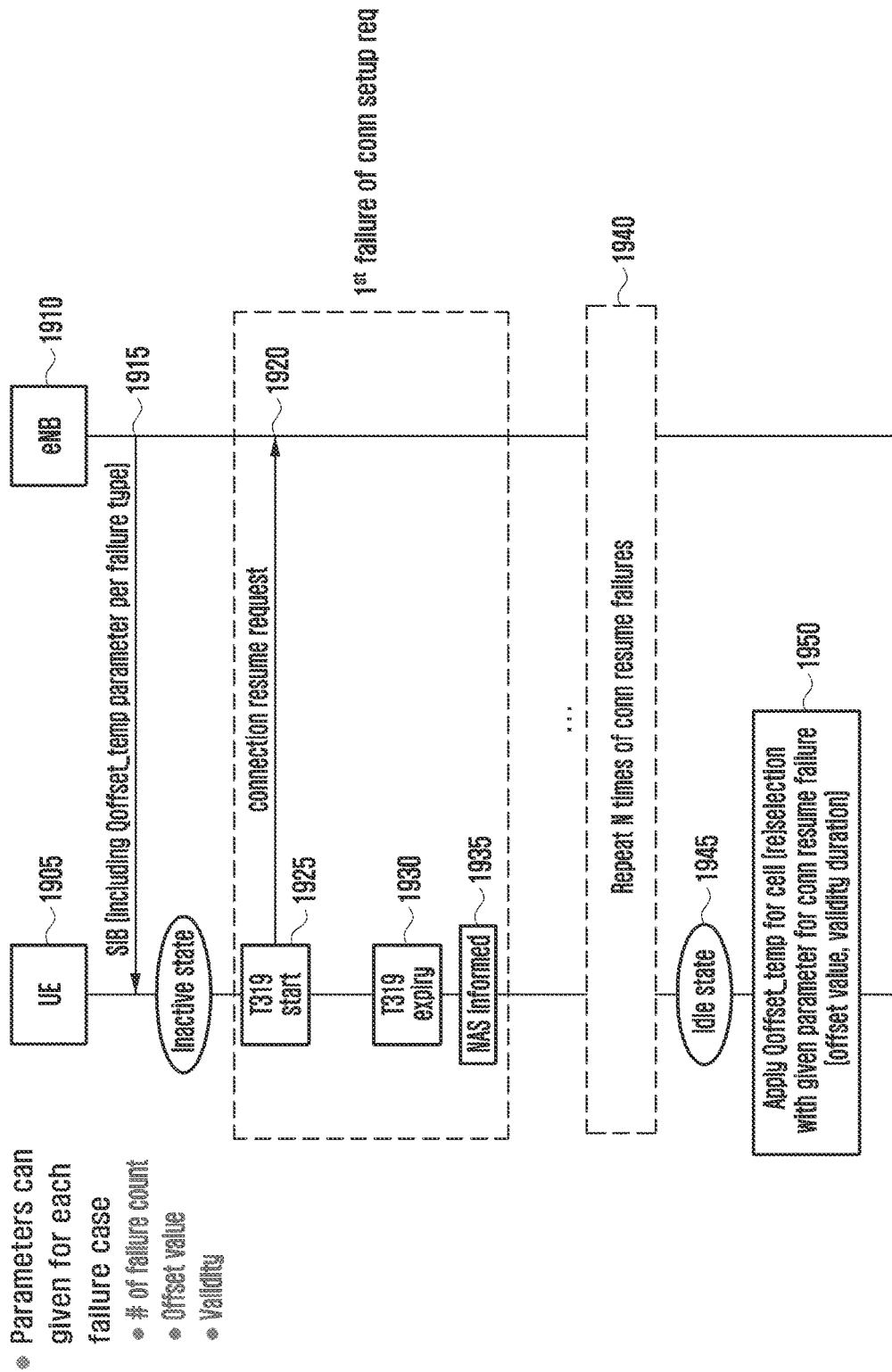
FIG. 19 is a signal flow diagram illustrating an operation of a terminal for (re-)selecting a cell by applying a predetermined power offset and a predetermined factor value if the terminal experiences a predetermined number of failures when the terminal transitions from an inactive state to a connected state, according to an embodiment of the disclosure.

FIG. 19 is a signal flow diagram illustrating an operation of a terminal for (re-)selecting a cell by applying a predetermined power offset and a predetermined factor value if the terminal experiences a predetermined number of failures when the terminal transitions from an inactive state to a connected state, according to an embodiment the disclosure.

Referring to FIG. 19, the terminal 1905 is in an inactive state. If the terminal 1905 has previously been in a connected state, the terminal 1905 may have received a Qoffset_temp-related factor according to a connection failure type through system information or RRC dedicated signaling from a serving base station 1910. Alternatively, in operation 1915, in an inactive state, the terminal 1905 may receive a Qoffset_temp-related factor according to a connection failure type through system information from a base station 1910 of a cell on which the terminal 1905 camps.

In this example, as Qoffset_temp-related factors, for each connection failure type, the number of relevant consecutive connection failures; a Qoffset_temp value which is a power offset value to be used during cell (re-)selection; and information on a period during which cell (re-)selection is to be performed by using the power offset value may be delivered. Each connection failure type may be expiry of a T300 timer or expiry of a T319 timer. If the same type of consecutive failures for the same cell occur by the above-described given number, the terminal 1905 performs a cell (re-)selection operation, to which a Qoffset_temp value defined in the corresponding type of connection failure case is applied, during a period defined in the corresponding type of connection failure case.

While the terminal 1905 desires connection resumption and delivers, in operation 1920, a connection resume request message to the base station 1910 on which the terminal 1905 camps, in operation 1925, the terminal 1905 starts the timer T319. If the T319 timer expires in operation 1930, the terminal 1905 notifies a NAS layer or a higher layer of a connection setup failure. Then, in operation 1940, it is assumed that the terminal 1905 repeats N times an operation of again receiving a connection resume request from the NAS layer, starting the T319 timer, transmitting a connection resume request message to the same cell, and causing the T319 timer to expire again. If the pieces of information received in operation 1915 are as follows: when the T300 timer expires, the number of consecutive connection failures: M+1, Qoffset_temp: K (dB), and a validity period: 100 ms; and when the T319 timer expires, the number of consecutive connection failures: N+1, Qoffset_temp: L (dB), and a validity period: 50 ms, after operation 1940, at operation 1950, the terminal 1905 performs cell (re-)selection by using L as the value of Qoffset_temp for 50 ms. In this example, in operation 1940, the terminal 1905 transitions from an inactive state to an idle state after (N+1) failures. That is, in the case of expiry of the T319 timer, if failures occur by the number of consecutive connection resume request failures, the terminal 1905 transitions to an idle state in operation 1945.

Figure 20:
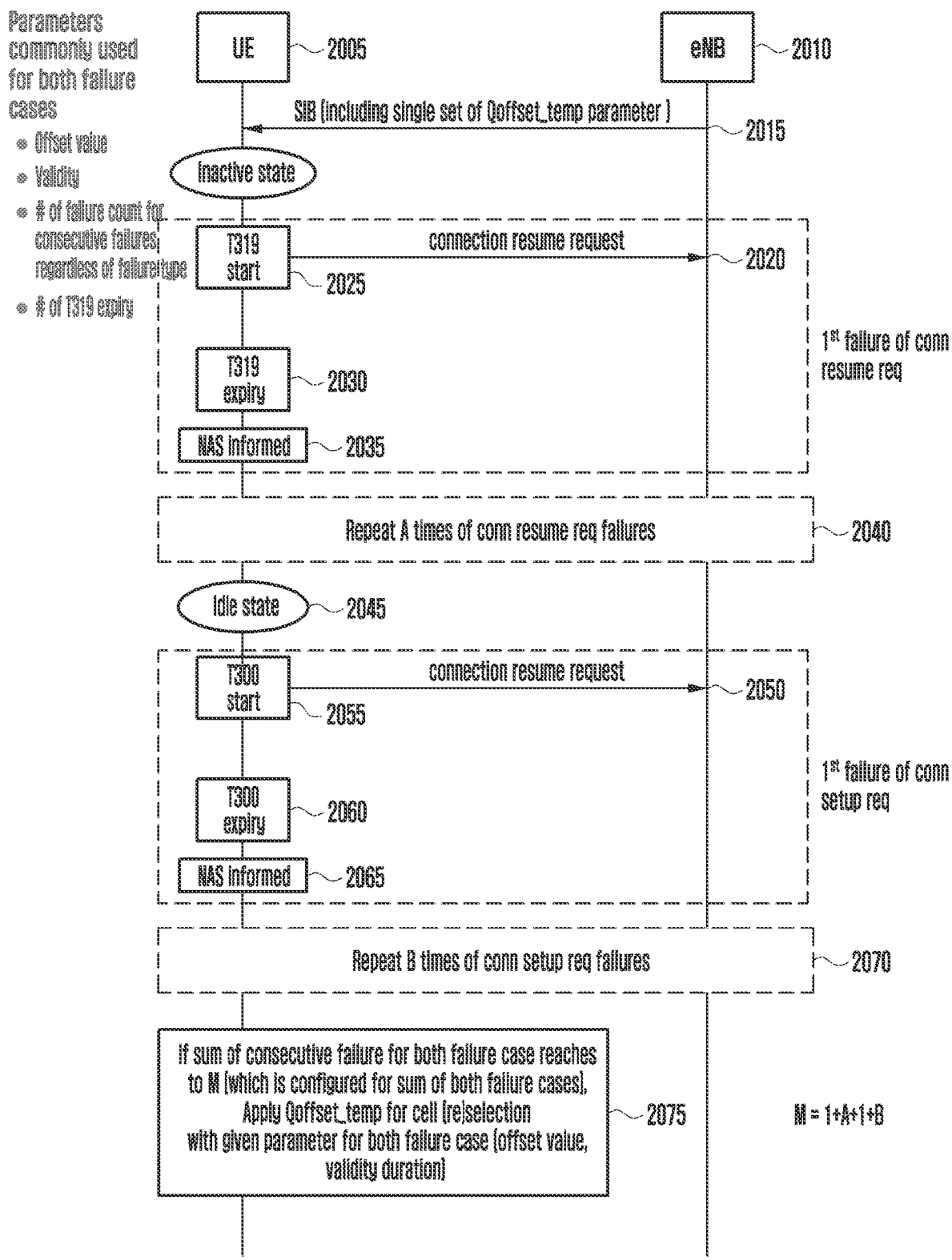
FIG. 20 is a signal flow diagram illustrating an operation of a terminal for (re-)selecting a cell by applying the same number of failures, a power offset, and a factor value, which are applied to two types of failures, if the terminal experiences a predetermined number of failures in an inactive state, and transitions to an idle state and again transitions to a connected state, when the terminal is to transition from the inactive state to the connected state, according to an embodiment of the disclosure.

FIG. 20 is a signal flow diagram illustrating an operation of a terminal for (re-)selecting a cell by applying the same number of failures, a power offset, and a factor value, which are applied to two types of failures, if the terminal: experiences a predetermined number of failures in an inactive state; and transitions to an idle state and again transitions to a connected state, when the terminal is to transition from the inactive state to the connected state, according to an embodiment the disclosure.

The terminal 2005 is in an inactive state. If the terminal 2005 has previously been in a connected state, the terminal 2005 may have received a Qoffset_temp-related factor which is identical regardless of a connection failure type through system information or RRC dedicated signaling from a serving base station 2010. Alternatively, in operation 2015, in an inactive state, the terminal 2005 may receive a Qoffset_temp-related factor which is identical regardless of a connection failure type through system information from a base station 2010 of a cell on which the terminal 2005 camps. Alternatively, in addition, a factor related to an allowable number of connection resumption failures due to expiry of a T319 timer may be delivered. If failures occur by this number, the terminal 2005 may transition from an inactive state to an idle state.

In this example, as Qoffset_temp-related factors, the number of relevant consecutive connection failures; a Qoffset_temp value which is a power offset value to be used during cell (re-)selection; and information on a period during which cell (re-)selection is to be performed by using the power offset value, each of which is identical regardless of a connection failure type, may be delivered. If consecutive failures irrelevant to a failure type for the same cell occur by the above-described given number, the terminal 2005 performs a cell (re-)selection operation, to which a given Qoffset_temp value is applied, during a given period.

While the terminal 2005 desires connection resumption and delivers, in operation 2020, a connection resume request message to the base station 2010 on which the terminal 2*i*-05 camps, in operation 2025, the terminal 2005 starts the timer T319. If the T319 timer expires in operation 2030, the terminal 2005 notifies a NAS layer or a higher layer of a connection setup failure. Then, in operation 2040, it is assumed that the terminal 2005 repeats A times an operation of again receiving a connection resume request from the NAS layer, starting the T319 timer, transmitting a connection resume request message to the same cell, and causing the T319 timer to expire again. Then, if failures occur by the number of allowable consecutive expiries of the T319 timer (or by the number of connection resumption failures) among the pieces of information received in operation 2015 ("1+A" in this example), in operation 2045, the terminal 2005 transitions to an idle state. Then, while the terminal 2005 again attempts to set up a connection and transmits, in operation 2050, a connection setup request message to the base station 2010 of the existing cell on which the terminal 2005 camps, in operation 2055, the terminal 2005 starts the T300 timer. If the T300 timer expires, in operation 2060, without a response from the base station 2010, in operation 2065, the terminal 2005 provides notification to a NAS layer. If the terminal 2005 further repeats operations 2055 to 2065 B times in operation 2070 so that the number of consecutive connection request failures for the same cell reaches the same number of failures which is applied to all cases regardless of failure types given in operation 2015 ("1+A+1+B" in this example), the terminal 2005 also applies, in operation 2075, to cell (re-)selection, the value of Qoffset_temp given in operation 2015, and applies the offset value during the validity period given in operation 2015.

The value of Qoffset_temp is added as an offset value to the reception strength of the radio wave from the cell that the terminal 2005 has received, and is used for comparison with a threshold for selection of a camping cell.

If A has a value of 0, that is, if T319 expiry occurs once, a terminal according to various embodiments may immediately transition to an idle state (IDLE mode). The terminal according to various embodiments may perform a cell selection operation or a cell reselection operation.

In this regard, the terminal may receive system information block 1 (SIB1) and factors which are related to cell selection or reselection and a connection establishment failure.

In this configuration, if the SIB1 received by the terminal includes a connection establishment failure-related factor and includes the set value of a connection establishment count, the terminal may perform the following operations.

The terminal may perform RRC connection setup.

Alternatively, as an operation accordingly, the terminal may transmit an RRC connection request message to a cell on which the terminal is camping.

Then, if a T300 timer expires, for example, if the T300 timer expires under condition 1 or condition 2 described below, the terminal may determine cell selection criteria or cell reselection criteria by using connEstFailOffset (Qoffset_temp). In this example, the connEstFailOffset may be used for a validity time.

Condition 1 in which the T300 timer consecutively expires by the value of connEstFailCount, for one cell in which SIB1 including connectionEstablishmentFailureControl (i.e., an IE including a Qoffset_temp-related factor) is broadcasted; or Condition 2 in which the T319 timer expires once and then the T300 timer consecutively expires by the value of connEstFailCount −1, for one cell in which SIB1 including connectionEstablishmentFailureControl (i.e., an IE including a Qoffset_temp-related factor) is broadcasted.

In this configuration, a case in which a value of a connection establishment count is set to 1 may be separately considered.

For example, while performing a cell selection or reselection operation, the terminal may receive SIB1, a cell (re-)selection factor, and a connection establishment failure-related factor.

In this example, if connEstFailurecount included in SIB1 has a value of 1, the terminal may attempt RRC connection setup or RRC resume request.

Further, if the T300 timer or the T319 timer expires as a result of the attempt for the connection setup, the terminal may determine cell selection criteria or cell reselection criteria by using connEstFaileOffset (Qoffset_temp). In this example, the connEstFaileOffset may be used for a given validity time.

In another embodiment, whether Qoffset_temp(connEstFaileOffset) is applied may be determined on the basis of only the given number of consecutive timer expires. If the Qoffset_temp is once applied and then the T300 timer additionally expires for the same cell, the existing applied validity time may be newly restarted.

Therefore, if a condition for determining whether a relevant state is a state in which Qoffset_temp is currently applied is included whenever a timer expires, a validity time may be prevented from being newly restarted. From this perspective, the following embodiment is possible. The terminal according to various embodiments may perform a cell selection operation or a cell reselection operation.

In this regard, the terminal may receive SIB1, a cell (re-)selection factor, and a connection establishment failure-related factor.

In this configuration, if the SIB1 received by the terminal includes a connection establishment failure-related factor and includes the set value of a connection establishment count, the terminal may perform the following operations.

The terminal may perform RRC connection setup. The terminal may transmit an RRC connection request message to a cell on which the terminal is camping.

If the T300 timer expires as a result of the request, for example, the T300 timer expires under condition 1 or condition 2 described below, and connEstFailOffset is currently not applied, the terminal may determine cell selection criteria or cell reselection criteria by using connEstFailOffset. The connEstFailOffset may be used for a given validity time.

Condition 1 in which the T300 timer consecutively expires by a value of connEstFailCount, for one cell in which SIB1 including connectionEstablishmentFailureControl (i.e., an IE including a Qoffset_temp-related factor) is broadcasted; or Condition 2 in which the T319 timer expires once and then the T300 timer consecutively expires by a value of connEstFailCount −1, for one cell in which SIB1 including connectionEstablishmentFailureControl (i.e., an IE including a Qoffset_temp-related factor) is broadcasted.

FIG. 21 and FIG. 22 are views illustrating a format of a usable connection setup failure report according to various embodiments of the disclosure.

In a format of a connection setup failure report, the same format may be used, and instead, a method for representing the type of connection setup failure may exist. Alternatively, according to the type of connection setup failure, information related to each connection setup failure is stored in a storage of a separate RRC message or a separate IE, and the separate RRC message or the separate IE may be delivered.

Referring to FIG. 21, a connection setup failure factor is represented by 1 bit in a report IE having the same format.

Referring to FIG. 22, a report for each type of connection failure is stored in a separate IE.

In order to indicate a failure type, the method "ENUMERATE {T310-expiry, T319-expiry}" may be used, in which ENUMERATED {T319-expiry} is expressed and an option field is used for differentiation. That is, if ENUMERATE {T319-expiry} is expressed, this expression signifies the expiry of the T319 timer. Alternatively, if the field does not exist, this absence is recognized as the expiry of the T300 timer. Alternatively, Boolean may be used such that "true" and "false" signify expiry of T300 and expiry of T319, respectively.

Figure 23:
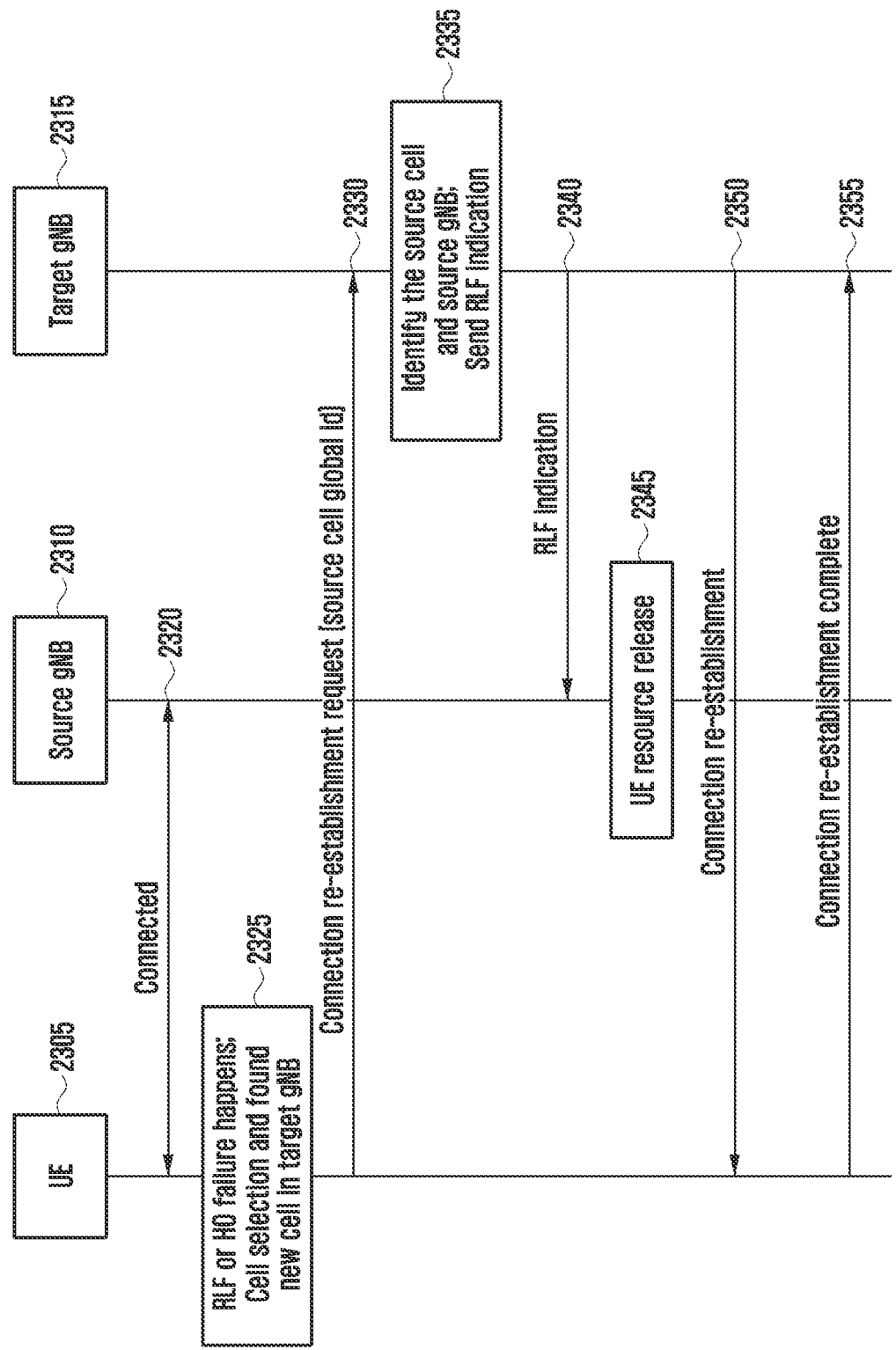
FIG. 23 is a signal flow diagram illustrating base station identification (ID) transmission for entry into a connection re-establishment request according to an embodiment of the disclosure.

FIG. 23 is a signal flow diagram illustrating base station ID transmission for entry into a connection re-establishment request according to an embodiment the disclosure.

In operation 2320, a terminal 2305 establishes a connection with a base station 2310 of a serving cell, and in operation 2325, a radio link failure (RLF) or a handover (HO) failure occurs. The terminal 2305 begins to perform an RRC connection re-establishment operation at this time. In operation 2330, the terminal 2305 selects a cell, and transmits an RRC connection re-establishment request message to a base station 2315 of the selected cell. In this configuration, an example of information transmitted together with the RRC connection re-establishment request message may include an only cell identifier in a PLMN of a cell in which the RLF or the HO failure has occurred, an only global cell identifier in an NR RAN, or an only global cell identifier in an NR and LTE RAN. Alternatively, an evolved cell global identifier (ECGI) in an NR RAN or an only ECGI in an NR and LTE RAN may be transmitted. Each ECGI includes one piece of information among the following pieces of information: a PLMN ID and a physical cell ID of a source cell; an ID and a RAT indicator of a source gNB. Further, an indicator obtained by combining or concatenating these pieces of information may become an ECGI.

The target base station 2315 receives this information, and acquires information on: a cell in which the relevant RLF or HO failure has occurred; and the base station 2310 which serves the cell. In operation 2335, the target base station 2315 may deliver an RLF indication message to an address of the source base station 2310 through the acquired information. In operation 2340, the RLF indication message includes an identifier of the terminal 2305 in case of the relevant RLF or HO failure, and may include an identifier which allows identifying of the relevant cell or the ECGI information transmitted in operation 2330. In operation 2345, if the source base station 2310 receives this information and identifies a terminal controlled by the source base station 2310 itself by using the received information, the source base station 2310 releases a resource allocated to the relevant terminal 2305. In operation 2350, the target base station 2315 receives a re-establishment request and identifies whether the target base station 2315 itself includes a context of the relevant terminal 2305 by using ID information (c-RNTI, ECGI, and shortMAC-I used in the source cell) of the terminal 2305 included in the received re-establishment request, and if the target base station 2315 includes the context of the relevant terminal 2305, delivers a connection re-establishment message to the terminal 2305. Operations 2350 and the operations after operations 2350 may be performed after or before operation 2340. Upon receiving the connection re-establishment message, the terminal 2305 resumes the released SRB1/SRB2 and DRB. Then, in operation 2355, the terminal 2305 delivers a connection reestablishment complete message to the target base station 2315.

Figure 24:
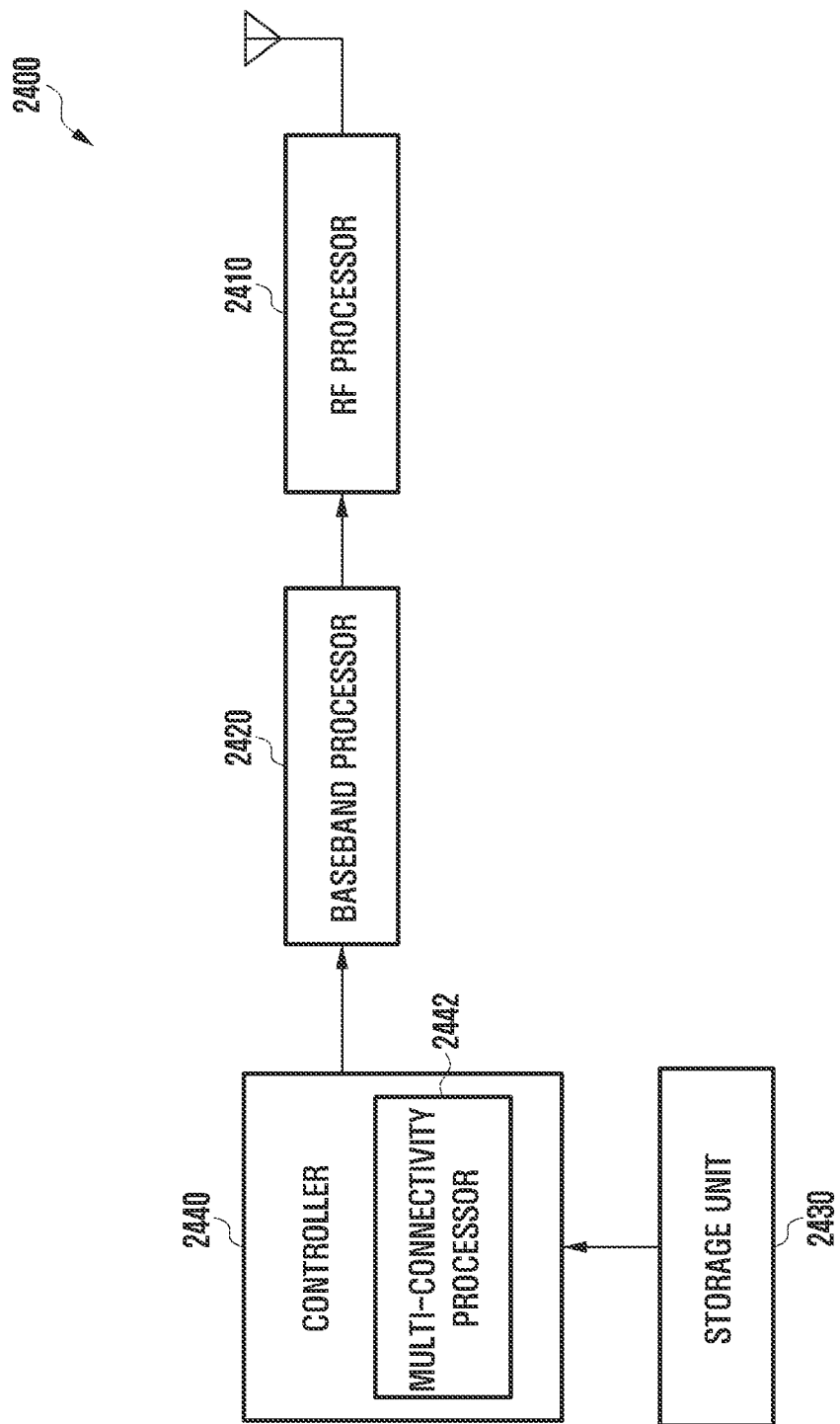
FIG. 24 is a block diagram illustrating an internal configuration of a terminal according to an embodiment of the disclosure.

FIG. 24 is a block diagram illustrating an internal configuration of a terminal according to an embodiment the disclosure.

Referring to FIG. 24, the terminal 2400 includes a radio frequency (RF) processor 2410, a baseband processor 2420, a storage unit 2430, and a controller 2440.

The RF processor 2410 serves to transmit or receive a signal through a wireless channel, such as band conversion and amplification of a signal. That is, the RF processor 2410 up-converts a baseband signal provided by the baseband processor 2420 into an RF band signal and then transmits the RF band signal through an antenna and down-converts an RF band signal received through the antenna into a baseband signal. For example, the RF processor 2410 may include a transmission filter, a reception filter, an amplifier, a mixer, an oscillator, a digital-to-analog converter (DAC), an analog-to-digital converter (ADC), or the like. FIG. 24 illustrates only one antenna but the terminal may be provided with multiple antennas. Also, the RF processor 2410 may include multiple RF chains. Further, the RF processor 2410 may perform beamforming. For the beamforming, the RF processor 2410 may adjust a phase and a magnitude of each of the signals transmitted or received through multiple antennas or antenna elements. Further, the RF processor 2410 may perform MIMO and may receive multiple layers during execution of a MIMO operation.

The baseband processor 2420 performs a conversion function between a baseband signal and a bit stream according to a physical layer standard of a system. For example, when data is transmitted, the baseband processor 2420 generates complex symbols by encoding and modulating a transmission bit stream. Further, when data is received, the baseband processor 2420 reconstructs a received bit stream by demodulating and decoding the baseband signal provided by the RF processor 2410. For example, according to an orthogonal frequency division multiplexing (OFDM) scheme, when data is transmitted, the baseband processor 2420 generates complex symbols by encoding and modulating a transmission bit stream, maps the complex symbols to subcarriers, and then performs an inverse fast Fourier transform (IFFT) operation and a cyclic prefix (CP) insertion to configure OFDM symbols. Further, when data is received, the baseband processor 2420 divides the baseband signal provided by the RF processor 2410 in an OFDM symbol unit, reconstructs the signals mapped to the subcarriers by a fast Fourier transform (FFT), and then reconstructs a received bit stream by the demodulation and decoding.

The baseband processor 2420 and the RF processor 2410 transmit and receive a signal as described above. Therefore, the baseband processor 2420 and the RF processor 2410 may be referred to as a "transmitter", a "receiver", a "transceiver", or a "communication unit". Also, at least one of the baseband processor 2420 and the RF processor 2410 may include multiple communication modules in order to support multiple different radio access technologies. Further, at least one of the baseband processor 2420 and the RF processor 2410 may include different communication modules in order to process signals in different frequency bands. For example, the different radio access technologies may include a wireless LAN (e.g., IEEE 802.11), a cellular network (e.g., LTE), and the like. The different frequency bands may include a super high frequency (SHF) (e.g., 2.5 GHz and 5 GHz) band and an mmWave (e.g., 60 GHz) band.

The storage unit 2430 stores data such as basic programs, application programs, and configuration information for an operation of the terminal. In particular, the storage unit 2430 may store information related to a second access node configured to perform wireless communication by using second radio access technology. Also, the storage unit 2430 provides the stored data in response to a request of the controller 2440.

The controller 2440 controls overall operations of the terminal. For example, the controller 2440 transmits or receives a signal through the baseband processor 2420 and the RF processor 2410. Further, the controller 2440 records and reads data in and from the storage unit 2440. To this end, the controller 2440 may include at least one processor. For example, the controller 2440 may include a multi-connectivity processor 2442 configured to control multiple connections, a communication processor (CP) configured to perform a control for communication and an application processor (AP) configured to control a higher layer such as an application program.

Figure 25:
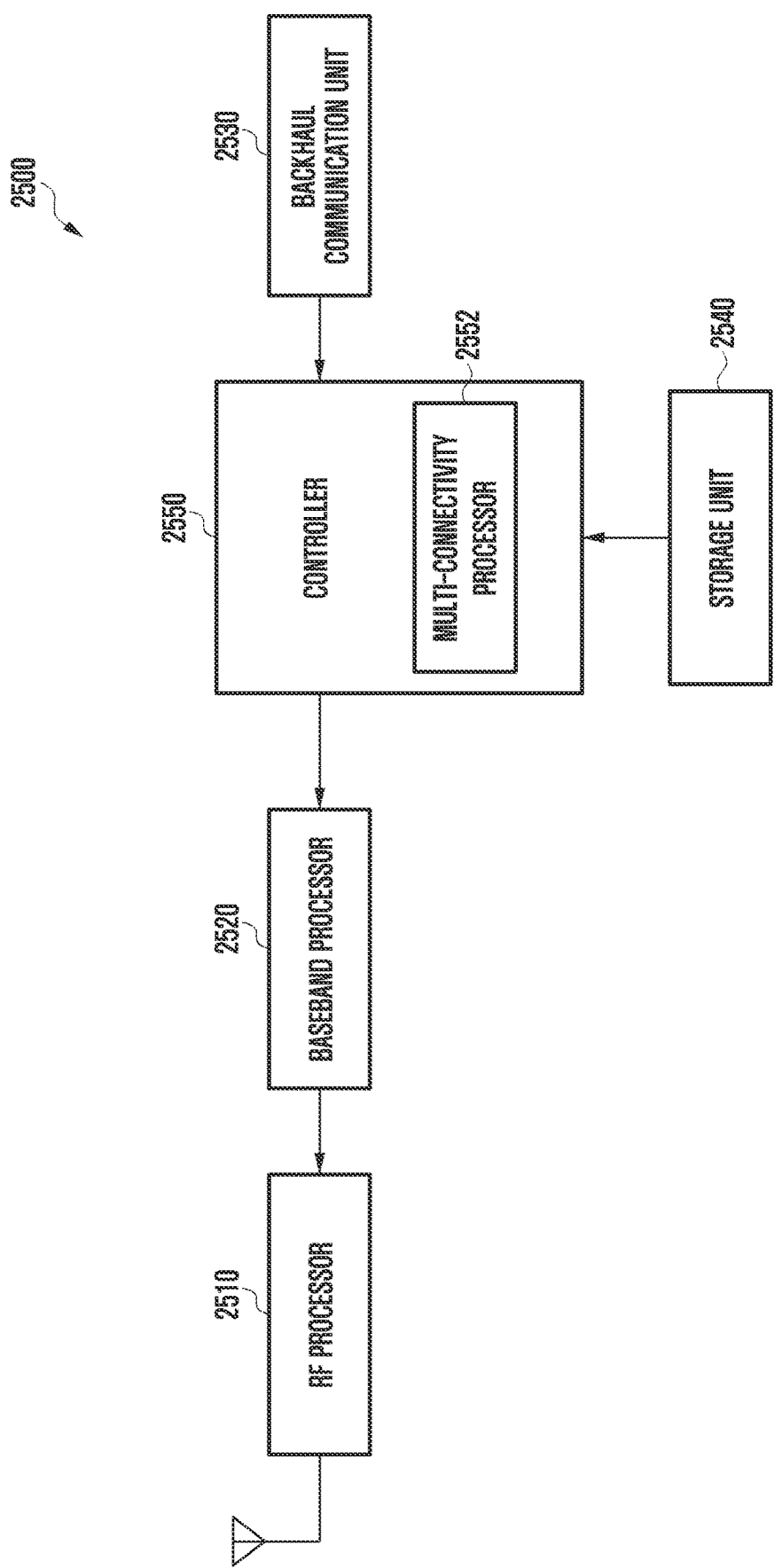
FIG. 25 is a block diagram illustrating a configuration of a new radio (NR) base station according to an embodiment of the disclosure.

FIG. 25 is a block diagram illustrating a configuration of an NR base station according to an embodiment the disclosure.

Referring to FIG. 25, the base station 2500 includes an RF processor 2510, a baseband processor 2520, a backhaul communication unit 2530, a storage unit 2540, and a controller 2550.

The RF processor 2510 serves to transmit or receive a signal through a wireless channel, such as band conversion and amplification of a signal. That is, the RF processor 2510 up-converts a baseband signal provided by the baseband processor 2520 into an RF band signal and then transmits the RF band signal through an antenna and down-converts an RF band signal received through the antenna into a baseband signal. For example, the RF processor 2510 may include a transmission filter, a reception filter, an amplifier, a mixer, an oscillator, a DAC, an ADC, or the like. FIG. 25 illustrates only one antenna but the first access node may be provided with multiple antennas. Also, the RF processor 2510 may include multiple RF chains. Further, the RF processor 2510 may perform beamforming. For the beamforming, the RF processor 2510 may adjust a phase and a magnitude of each of the signals transmitted or received through multiple antennas or antenna elements. The RF processor 2510 may be configured to transmit one or more layers for a downlink MIMO operation.

The baseband processor 2520 may perform a conversion function between a baseband signal and a bit stream according to a physical layer standard of first radio access technology. For example, when data is transmitted, the baseband processor 2520 generates complex symbols by encoding and modulating a transmission bit stream. Further, when data is received, the baseband processor 2520 reconstructs a received bit stream by demodulating and decoding the baseband signal provided by the RF processor 2510. For example, according to an OFDM scheme, when data is transmitted, the baseband processor 2520 generates complex symbols by encoding and modulating a transmission bit stream, maps the complex symbols to subcarriers, and then performs an IFFT operation and a CP insertion to configure OFDM symbols. Further, when data is received, the baseband processor 2520 divides the baseband signal provided by the RF processor 2510 in an OFDM symbol unit, reconstructs the signals mapped to the subcarriers by a fast Fourier transform (FFT) operation, and then reconstructs a received bit stream by the modulation and decoding. The baseband processor 2520 and the RF processor 2510 transmit and receive signals as described above. Accordingly, the baseband processor 2520 and the RF processor 2510 may be referred to as a "transmitter", a "receiver", a "transceiver", a "communication unit", or a "wireless communication unit".

The backhaul communication unit 2530 provides an interface for communication with other nodes in a network. That is, the backhaul communication unit 2530 converts a bit stream to be transmitted from the primary base station to another node, for example, an auxiliary base station and a core network, into a physical signal and converts a physical signal received from another node to a bit stream.

The storage unit 2540 stores data such as basic programs, application programs, and configuration information for an operation of the primary base station. In particular, the storage unit 2540 may store information on the bearers allocated to accessed terminals, measurement results reported by the accessed terminals, and the like. Also, the storage unit 2540 may store the information which becomes a standard of determination of whether to provide or stop providing multi-connectivity to a terminal. Further, the storage unit 2540 provides the stored data according to a request of the controller 2550.

The controller 2550 controls overall operations of the primary base station. For example, the controller 2550 transmits or receives a signal through the baseband processor 2520 and the RF processor 2510, or through the backhaul communication unit 2530. Further, the controller 2550 records and reads data in and from the storage unit 2540. To this end, the controller 2550 may include at least one processor, such as a multi-connectivity processor 2552 configured to control multiple connections, a CP configured to perform a control for communication and an AP configured to control a higher layer such as an application program.

While the disclosure has been shown and described with reference to various embodiments thereof, it will be understood by those skilled in the art that various changes in form and details may be made therein without departing from the spirit and scope of the disclosure as defined by the appended claims and their equivalents.

The above-described embodiments of the disclosure and the accompanying drawings have been provided only as specific examples in order to assist in understanding the disclosure and do not limit the scope of the disclosure. Accordingly, those skilled in the art to which the disclosure pertains will understand that other change examples based on the technical idea of the disclosure may be made without departing from the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

The operations performed by the module, programming module, or any other component according to various embodiments may be executed sequentially, in parallel, repeatedly, or by a heuristic method. Additionally, some operations may be executed in different orders or omitted, or any other operation may be added.

The methods of the embodiments illustrated in FIGS. 1 to 25 can include a combination of methods from more than one illustration. For example, FIGS. 1 to 25 illustrate operations related to a paging monitoring method and reporting a connection setup failure method based on various embodiments, the methods can include a combination of methods from more than one illustration.

What is claimed is:

1. A method of a user equipment (UE) in a wireless communication system, the method comprising:
    transmitting, to a base station, a radio resource control (RRC) connection resume request message for a current cell, while the UE is in an RRC inactive state;
    starting a T319 timer, upon the transmission of the RRC connection resume request message; and
    based on an expiration of the T319 timer:
        identifying whether a cell ID of the current cell is equal to a cell ID of a cell associated with stored connection resume failure information;
        in case that the cell ID of the current cell is not equal to the cell ID of the cell associated with the stored connection resume failure information, resetting a number of consecutive failures to an initial value; and
        storing connection resume failure information associated with the current cell, wherein the number of consecutive failures indicates a number of consecutive failed RRC resume procedures in a same cell.

2. The method of claim 1,
wherein the connection resume failure information associated with the current cell includes a global cell ID of the current cell.

3. The method of claim 2,
wherein the connection resume failure information associated with the current cell further includes at least one of information for current cell measurements or information for neighbor cell measurements.

4. The method of claim 3,
wherein the information for the current cell measurements includes measurement information for a first beam associated with the current cell and index information of the first beam.

5. The method of claim 3,
wherein the information for the neighbor cell measurements includes measurement information for a second beam associated with a neighboring cell and index information of the second beam.

6. The method of claim 1, further comprising,
receiving a value of the T319 timer through RRC dedicated signaling or system information from the base station.

7. The method of claim 1, further comprising:
transitioning from the RRC inactive state to an RRC idle state after the T319 timer expires.

8. A user equipment (UE) in wireless communication system, the UE comprising:
a transceiver; and
a controller configured to:
transmit, to a base station, a radio resource control (RRC) connection resume request message for a current cell, while the UE is in an RRC inactive state,
start a T319 timer, upon the transmission of the RRC connection resume request message, and
based on an expiration of the T319 timer:
identify whether a cell ID of the current cell is equal to a cell ID of a cell associated with stored connection resume failure information,
in case that the cell ID of the current cell is not equal to the cell ID of the cell associated with the stored connection resume failure information, reset a number of consecutive failures to an initial value, and
store connection resume failure information associated with the current cell,
wherein the number of consecutive failures indicates a number of consecutive failed RRC resume procedures in a same cell.

9. The UE of claim 8,
wherein the connection resume failure information associated with the current cell includes a global cell ID of the current cell.

10. The UE of claim 9,
wherein the connection resume failure information associated with the current cell further includes at least one of information for current cell measurements or information for neighbor cell measurements.

11. The UE of claim 10,
wherein the information for the current cell measurements includes measurement information for a first beam associated with the current cell and index information of the first beam.

12. The UE of claim 10,
wherein the information for the neighbor cell measurements includes measurement information for a second beam associated with a neighboring cell and index information of the second beam.

13. The UE of claim 8, the controller is further configured to:
receive a value of the T319 timer through RRC dedicated signaling or system information from the base station.

14. The UE of claim 8, the controller is further configured to:
transition from the RRC inactive state to an RRC idle state after the T319 timer expires.

* * * * *